(12) United States Patent
Muylaert et al.

(10) Patent No.: US 6,860,450 B2
(45) Date of Patent: Mar. 1, 2005

(54) APPARATUS AND METHOD FOR FOLDING HELICOPTER ROTOR BLADES FOR STORAGE AND TRANSPORT OF HELICOPTER

(75) Inventors: Neal W. Muylaert, Apache Junction, AZ (US); Angelo A. Scardullo, Mesa, AZ (US); Conan A. Hansen, Mesa, AZ (US); Aidan T. Foley, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/329,250

(22) Filed: Dec. 23, 2002

(65) Prior Publication Data

US 2004/0118970 A1 Jun. 24, 2004

(51) Int. Cl.$^7$ .............................................. B64C 27/50
(52) U.S. Cl. .................................... 244/17.11; 416/143
(58) Field of Search ............................... 244/17.11, 49; 416/143, 140–142, 33

(56) References Cited

U.S. PATENT DOCUMENTS

| | | | | |
|---|---|---|---|---|
| 2,549,886 A | * | 4/1951 | Buivid | 244/17.11 |
| 3,101,785 A | * | 8/1963 | Leoni | 416/143 |
| 3,135,333 A | * | 6/1964 | Cruz et al. | 416/143 |
| 3,192,820 A | * | 7/1965 | Pitzer | 411/33 |
| 4,268,222 A | * | 5/1981 | Bernard | 416/1 |
| 4,436,483 A | * | 3/1984 | Watson | 416/143 |
| 4,712,978 A | * | 12/1987 | Tiemann | 416/1 |
| 4,738,592 A | * | 4/1988 | Cavanaugh | 416/140 |
| 5,951,252 A | | 9/1999 | Muylaert | |
| 5,951,259 A | | 9/1999 | Gardner et al. | |
| 6,213,712 B1 | | 4/2001 | Muylaert | |

OTHER PUBLICATIONS

Boeing AH 64D Apache "the ultimate six pack" press release 1998.*
Generation5: Artificial Intelligence Repository– AH–64 Apache pp. 1–2 date ?.*

* cited by examiner

Primary Examiner—Galen Barefoot
(74) Attorney, Agent, or Firm—Thompson Coburn LLP

(57) ABSTRACT

A method comprises providing six helicopters. Each helicopter has a fuselage, a main rotor assembly extending out from the fuselage and rotatable about a main rotor axis, and four main rotor blades coupled to the main rotor assembly. The main rotor blades of each helicopter are moveable relative to the main rotor assembly between a deployed position and a stowed position. The deployed position is a position in which the four main rotor blades extend radially from the main rotor. The main rotor blades have a blade rotor diameter of at least forty seven feet when in the deployed position. The four main rotor blades are coupled to the main rotor assembly when in the stowed position. The method further comprises positioning the six helicopters relative to each other such that all six of the helicopters are simultaneously contained within a parallelepiped region having a height of less than fifteen feet, a width of less than twenty feet, and a length of less than one hundred forty five feet. The four main rotor blades of each of the six helicopters are in their stowed positions when the six helicopters are simultaneously contained within the parallelepiped region.

25 Claims, 13 Drawing Sheets

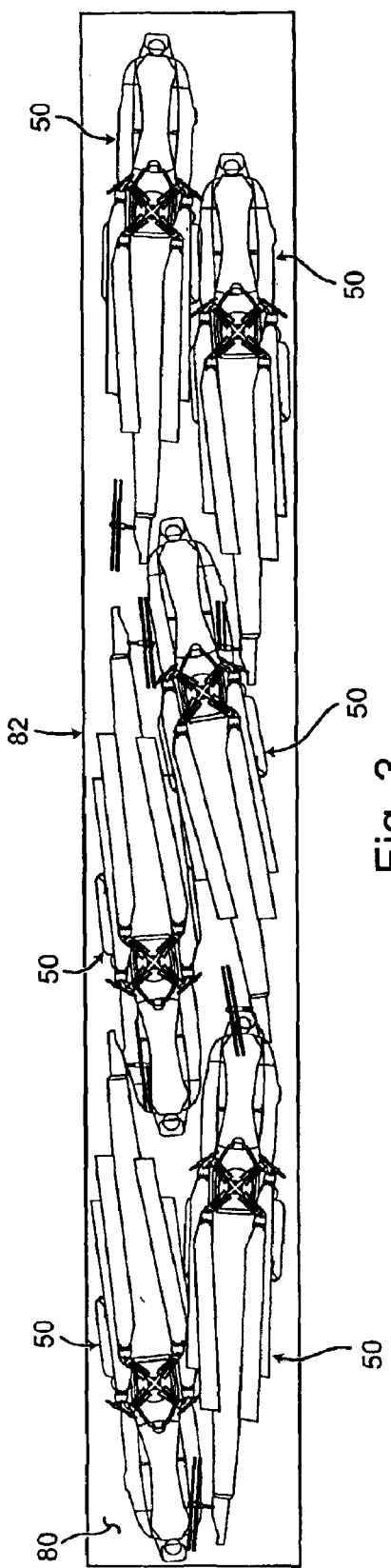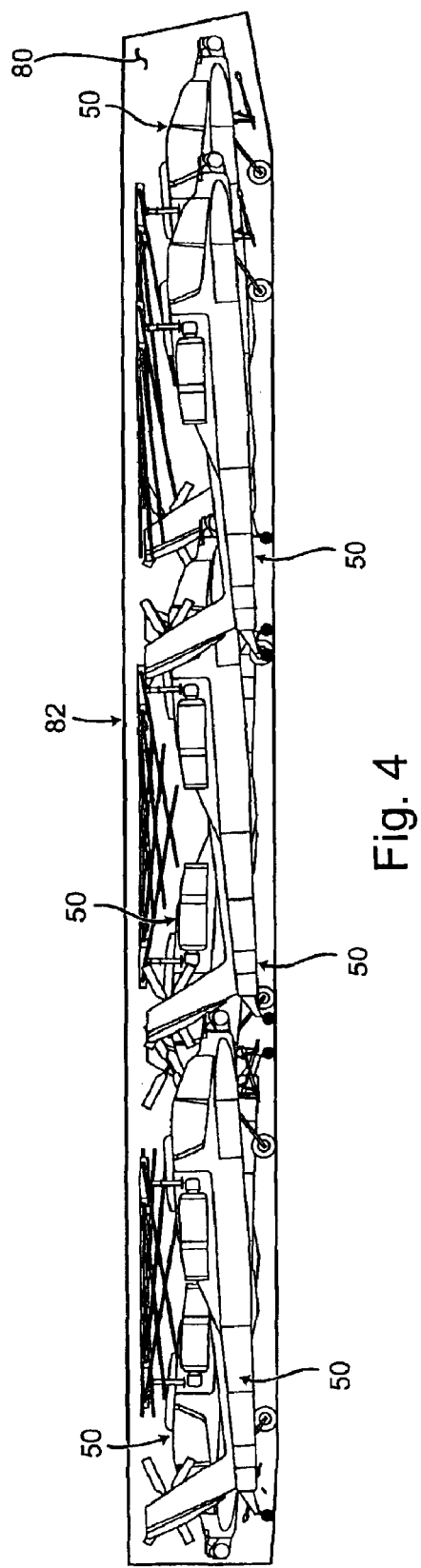
Fig. 3
Fig. 4

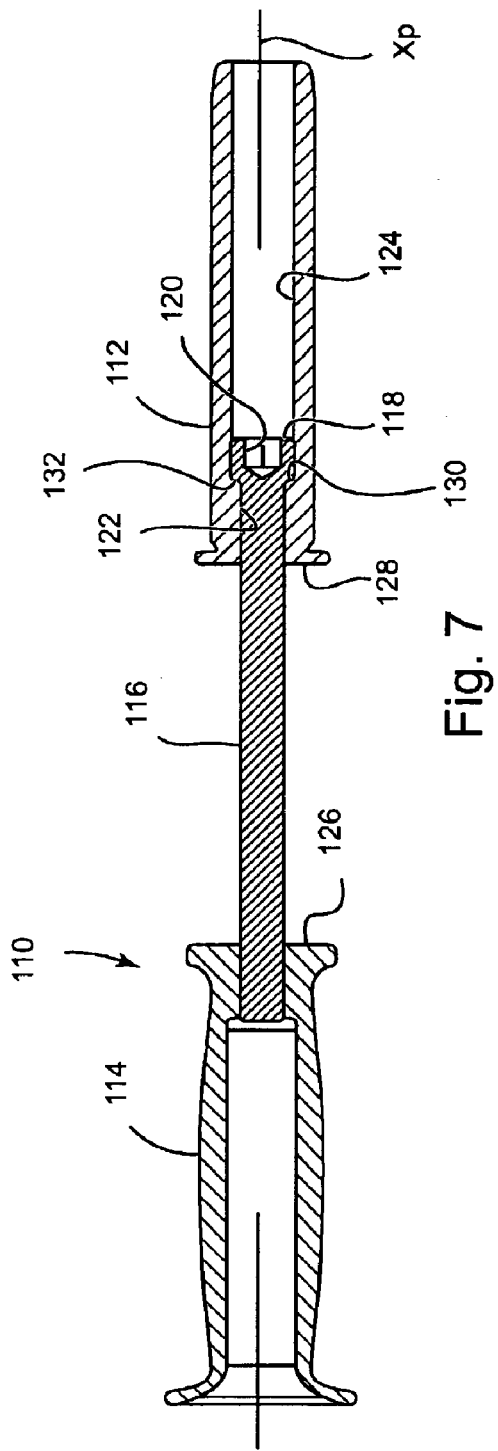
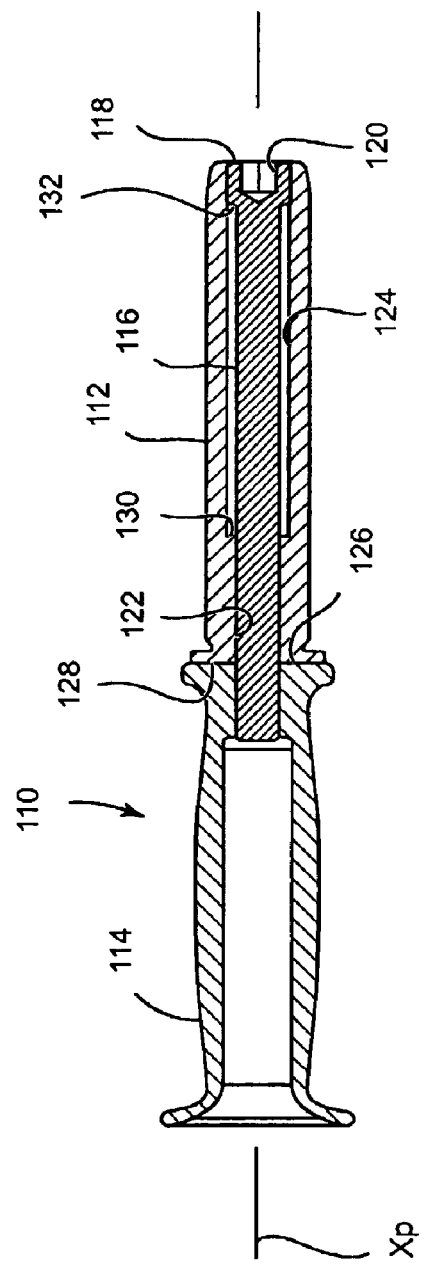

under contract number DAAH23-00-C-001 awarded by the U.S. Army. Accordingly, the United States Government has certain rights in the present invention.

APPARATUS AND METHOD FOR FOLDING HELICOPTER ROTOR BLADES FOR STORAGE AND TRANSPORT OF HELICOPTER

STATEMENT REGARDING FEDERALLY SPONSORED RESEARCH

The present invention was made with government support under contract number DAAH23-00-C-001 awarded by the U.S. Army. Accordingly, the United States Government has certain rights in the present invention.

BACKGROUND OF THE INVENTION

To provide the power required to support the flight capabilities of helicopters, the main rotors of helicopters incorporate a plurality of main rotor blades having large radial dimensions. The large radial dimensions of helicopter rotor assemblies results in helicopters having large structural envelopes that occupy an inordinate amount of space. For example, an Apache helicopter, has a main rotor with four main rotor blades, a rotor diameter of approximately 48 feet (each main rotor blade has a length of approximately 21 feet), a fuselage length of approximately 49 feet, an overall length of approximately 58 feet and a height of nearly 17 feet. It is often desirable to reduce the structural envelopes of such helicopters to facilitate rapid deployment, routine transport, stowage, and/or to reduce the vulnerability thereof to environmental conditions.

Several options are available to reduce the structural envelopes of helicopters. One option is to design the main rotors of helicopters so that the main rotor blades may be removed from the rotor hub assembly (i.e., the main rotor assembly). While this is a viable solution in some circumstances, it should be appreciated that such main rotors may be unnecessarily complex. In addition, it should be appreciated that removal of the main rotor blades tends to be time consuming and labor intensive. Moreover, these same time constraints and labor requirements exist when the helicopter is reconfigured for subsequent flight operations. Further, removal of the main rotor blades may require rebalancing of the blades upon reattachment. Therefore, reduction of the structural envelope of helicopters by removal of the main rotor blades may not be the most viable option under some circumstances.

Another option available to reduce the structural envelopes of helicopters is to design the main rotor assemblies thereof so that the main rotor blades may be folded about the main rotor hub assembly. Main rotor blade folding operations may be implemented either automatically via hydraulic systems or manually. However, in helicopter rotors having four main rotor blade, the prior art methods of folding have not sufficiently reduced the structural envelope.

SUMMARY OF THE INVENTION

Generally, a method of the present invention comprises positioning at least five Apache military helicopters in a cargo region of a C-5 Galaxy military cargo airplane. Each of the helicopters has a fuselage, a main rotor assembly extending out from the fuselage, and four main rotor blades coupled to the main rotor assembly. The helicopters are positioned in the cargo region in a manner such that all of the helicopters are simultaneously in the cargo region with each helicopter having its four main rotor blades coupled to its main rotor assembly.

Another aspect of the present invention is a method comprising providing at least five helicopters and positioning the at least five helicopter within a cargo region of an airplane. Each of the helicopters has a fuselage, a main rotor assembly extending out from the fuselage and rotatable about a main rotor axis, and four main rotor blades coupled to the main rotor assembly. The main rotor blades of each helicopter are moveable relative to the main rotor assembly between a deployed position and a stowed position. The deployed position is a position in which the four main rotor blades extend radially from the main rotor. The main rotor blades have a blade rotor diameter of at least forty seven feet when in the deployed position. The four main rotor blades are coupled to the main rotor assembly when in the stowed position.

The at least five helicopters are positioned within the cargo region of the airplane such that all of the at least five helicopters are simultaneously within the cargo region with the four main rotor blades of each helicopter are in the stowed position. The cargo region has a height of less than fifteen feet, a width of less than twenty feet, and a length of less than one hundred forty five feet.

Another aspect of the present invention is a method comprising providing six helicopters and positioning the six helicopters relative to each other such that all of the six helicopters are simultaneously contained within a parallel-epiped region. Each of the helicopters has a fuselage, a main rotor assembly extending out from the fuselage and rotatable about a main rotor axis, and four main rotor blades coupled to the main rotor assembly. The main rotor blades of each helicopter are moveable relative to the main rotor assembly between a deployed position and a stowed position. The deployed position is a position in which the four main rotor blades extend radially from the main rotor. The main rotor blades have a blade rotor diameter of at least forty seven feet when in the deployed position. The four main rotor blades are coupled to the main rotor assembly when in the stowed position. The parallelepiped region has a height of less than fifteen feet, a width of less than twenty feet, and a length of less than one hundred forty five feet. The four main rotor blades of each of the six helicopters are in the stowed position when the six helicopters are simultaneously contained within the parallelepiped region.

Another aspect of the present invention is an assembly comprising six helicopters. Each of the helicopters has a fuselage, a main rotor assembly extending out from the fuselage and rotatable about a main rotor axis, and four main rotor blades coupled to the main rotor assembly. The main rotor blades of each helicopter are moveable relative to the main rotor assembly between a deployed position and a stowed position. The deployed position is a position in which the four main rotor blades extend radially from the main rotor. The main rotor blades have a blade rotor diameter of at least forty seven feet when in the deployed position. The four main rotor blades are coupled to the main rotor assembly when in the stowed position. The six helicopters are in an arrangement such that all six of the helicopters are completely contained within a parallelepiped volume having a height of less than fifteen feet, a width of less than twenty feet, and a length of less than one hundred forty five feet. The four main rotor blades of each of the six helicopters are in the stowed position.

Another aspect of the present invention is a method comprising providing a helicopter having a fuselage including a forward section and an aft section rearward of the forward section, a main rotor assembly extending out from the forward section of the fuselage, and four main rotor blades coupled to the main rotor assembly. Each of the main rotor blades has a length of at least twenty feet. Each of the main rotor blades has a root end and a tip end. The four main rotor blades comprises a first rotor blade, a second rotor blade, a third rotor blade, and a fourth rotor blade. The method further comprises folding the four main rotor blades rearwardly relative to the main rotor assembly from a deployed position to a stowed position. The deployed position is a position in which the first rotor blade extends radially outwardly from the main rotor assembly generally in a first direction, the second rotor blade extends radially outwardly from the main rotor assembly generally in a second direction opposite the first direction such that the tip end of the second rotor blade is at least forty seven feet from the tip end of the first rotor blade, the third rotor blade extends radially outwardly from the main rotor assembly generally in a third direction, and the fourth rotor blade extends radially outwardly from the main rotor assembly generally in a fourth direction opposite the third direction such that the tip end of the fourth rotor blade is at least forty seven feet from the tip end of the third rotor blade. The stowed position is a position in which the four main rotor blades extend generally rearwardly from the main rotor assembly in a manner such that none of the tip ends is spaced from any of the other of the tip ends a distance greater than ten feet.

Another aspect of the present invention is a method comprising providing a helicopter having a fuselage including a forward section and a tail section rearward of the forward section, a main rotor assembly extending out from the forward section of the fuselage, and four main rotor blades coupled to the main rotor assembly. One of the main rotor blades constitutes a first rotor blade. A first rotor blade portion of the first rotor blade is attached to a first rotor assembly portion of the main rotor assembly via a first retention pin. A second rotor blade portion of the first rotor blade is attached to a second rotor assembly portion of the main rotor assembly via a second retention pin. The method further comprises: removing the first retention pin in a manner such that the first retention pin is released from attaching the first rotor blade to the main rotor assembly; folding the first rotor blade rearwardly relative to the main rotor assembly from a deployed position to a stowed position, the deployed position being a position in which the first rotor blade portion is adjacent the first rotor assembly portion, the stowed position being a position in which the first rotor blade portion is spaced from the first rotor assembly portion; providing a blade fold position block comprising a blade connection portion and a rotor assembly connection portion; and pinning the first rotor blade portion to the blade connection portion and pinning the first rotor assembly portion to the rotor assembly connection portion in a manner such that the blade fold position block maintains the first rotor blade in the stowed position.

Another aspect of the present invention is a retention pin assembly comprising a shank and a handle. The shank has a shank axis. The handle is operatively connected to the shank for movement of the handle relative to the shank generally along the shank axis between a first position and a second position. The second position is axially spaced from the first position. The retention pin assembly further includes opposing first and second surfaces and opposing third and fourth surfaces. The first surface is spaced from the second surface when the handle is in its first position. The first surface engages the second surface when the handle is in its second position. The third surface engages the fourth surface when the handle is in its first position. The third surface is spaced from the fourth surface when the handle is in its second position. The retention pin assembly is configured such that movement of the handle relative to the shank along the shank axis from the first position to the second position causes the first surface to collide with the second surface in a manner to force the shank along the shank axis in a first direction. The retention pin assembly is configured such that movement of the handle relative to the shank along the shank axis from the second position to the first position causes the fourth surface to collide with the third surface in a manner to force the shank along the shank axis in a second direction opposite the first direction.

Another aspect of the present invention is a blade positioning mechanism for folding a helicopter main rotor blade attached to a main rotor assembly via two blade pins. The blade positioning mechanism comprises a rotor assembly connection, a rotor blade clamp, and a clamp positioner. The rotor assembly connection is adapted to temporarily attach to the main rotor assembly with two degrees of freedom relative to the main rotor assembly. The rotor blade clamp is adapted to temporarily attach to the rotor blade. The clamp positioner is attached to the rotor blade clamp and the rotor assembly connection. The clamp positioner is adapted to pivot with two degrees of freedom relative to the rotor blade clamp and adapted to position the rotor blade clamp a distance from the rotor assembly connection after removal of one of the blade pins. The clamp positioner comprises a threaded stud, a female knuckle, and a handle. The threaded stud has a longitudinal central stud axis, a threaded outer surface, and a journal portion journaled to one of the rotor assembly connection and rotor blade clamp for rotation of the threaded stud relative to the one of the rotor assembly connection and rotor blade clamp about the stud axis. The female knuckle engages the threaded stud and is attached to the other of the rotor assembly connection and rotor blade clamp in a manner such that rotating the threaded stud about the stud axis causes the female knuckle and the other of the rotor assembly connection and rotor blade clamp to move axially along the stud axis. The handle is connected to the threaded stud in a manner such that the female knuckle is between the journal portion and the handle.

Another aspect of the present invention comprises a helicopter, a first swing link, and a second swing link. The helicopter has a fuselage including a forward section and an aft section rearward of the forward section. The main rotor assembly extends out from the forward section of the fuselage and four main rotor blades coupled to the main rotor assembly. Each of the main rotor blades has a root end and a tip end. The four main rotor blades comprises a first rotor blade, a second rotor blade, a third rotor blade, and a fourth rotor blade. The four main rotor blades are in stowed positions in which each main rotor blade extends generally rearwardly from the main rotor assembly. The root end of the first rotor blade is directly connected to the main rotor assembly. The root end of the third rotor blade is directly connected to the main rotor assembly. The first swing link mechanism is detachably connected to the root end of the second rotor blade and the main rotor assembly. The first swing link spaces the root end of the second rotor blade from the main rotor assembly. The second swing link mechanism is detachably connected to the root end of the fourth rotor blade and the main rotor assembly. The second swing link spaces the root end of the fourth rotor blade from the main rotor assembly.

Another aspect of the present invention is a method comprising providing a helicopter and providing a swing link. The helicopter has a fuselage including a forward section and a tail section rearward of the forward section, a main rotor assembly extending out from the forward section of the fuselage, and at least one main rotor blade coupled to the main rotor assembly. A first rotor blade portion of the rotor blade is attached to a first rotor assembly portion of the main rotor assembly via a first retention pin. A second rotor blade portion of the rotor blade is attached to a second rotor assembly portion of the main rotor assembly via a second retention pin. The swing link comprises a blade connection portion and a rotor assembly connection portion. The rotor assembly connection portion is spaced from the blade connection portion. The method further comprises removing the first retention pin in a manner such that the first retention pin is released from attaching the first rotor blade portion to the first rotor assembly portion, and folding the rotor blade relative to the main rotor assembly from a first portion attachment position to a swing-link receiving position. The first portion attachment position is a position in which the first rotor blade portion is adjacent the first rotor assembly portion. The swing-link receiving position is a position in which the first rotor blade portion is spaced from the first rotor assembly portion a distance for receiving the swing link. The method further comprises pinning the first rotor assembly portion to the rotor assembly connection portion of the swing link at a first pin axis and pinning the first rotor blade portion to the blade connection portion of the swing link at a second pin axis, removing the second retention pin in a manner such that the second retention pin is released from attaching the second rotor blade portion to the second rotor assembly portion, and moving the rotor blade relative to the main rotor assembly from a second portion attachment position to a stowed position. The second portion attachment position is a position in which the second rotor blade portion is adjacent the second rotor assembly portion. The stowed position is a position in which the second rotor blade portion is spaced a distance $D_s$ from the second rotor assembly portion. The rotor blade pivots relative to the main rotor assembly about one of the first and second pin axes during at least a portion of the movement of the rotor blade from the second portion attachment position to the stowed position.

Another aspect of the present invention is a method comprising providing a helicopter and providing a blade positioning mechanism. The helicopter has a fuselage including a forward section and a tail section rearward of the forward section, a main rotor assembly extending out from the forward section of the fuselage, and at least one main rotor blade coupled to the main rotor assembly. A first rotor blade portion of the rotor blade is attached to a first rotor assembly portion of the main rotor assembly via a first retention pin. A second rotor blade portion of the rotor blade is attached to a second rotor assembly portion of the main rotor assembly via a second retention pin. The blade positioning mechanism comprises a rotor assembly connection adapted for connection to the main rotor assembly, a rotor blade connection adapted for connection to the rotor blade, and a threaded stud. The threaded stud has a longitudinal central stud axis, a threaded outer surface, and a journal portion journaled to one of the rotor assembly connection and the rotor blade connection for rotation of the threaded stud relative to the one of the rotor assembly connection and the rotor blade connection. The other of the rotor assembly connection and the rotor blade connection has a female knuckle threadably engaging the threaded outer surface of the threaded stud such that rotating the treaded stud about the stud axis causes the other of the rotor assembly connection and rotor blade connection to move axially along the stud axis. The method further comprises removing the second retention pin in a manner such that the second retention pin is released from attaching the second rotor blade portion to the second rotor assembly portion, and moving the rotor blade relative to the main rotor assembly from the second portion attachment position to a blade positioning mechanism receiving position. The blade positioning mechanism receiving position is a position in which the second rotor blade portion is spaced a sufficient distance from the second rotor assembly portion to enable connection of the blade positioning mechanism to the second rotor blade portion and the second rotor assembly portion. The method further comprises pinning the rotor assembly connection of the blade positioning mechanism to the second rotor assembly portion of the main rotor assembly at a first mechanism pin axis and pinning the rotor blade connection of the blade positioning mechanism to the second rotor blade portion of the rotor blade at a second mechanism pin axis. The pinning of the blade positioning mechanism to the second rotor assembly portion and the second rotor blade portion occurring when the rotor blade and the main rotor assembly are in the blade positioning mechanism receiving position. The method further comprises moving the rotor blade relative to the main rotor assembly from the blade positioning mechanism receiving position to a stowed position. The stowed position is a position in which the second rotor blade portion is spaced a distance $D_s$ from the second rotor assembly portion. The step of moving the rotor blade from the blade positioning mechanism receiving position to the stowed position comprising rotating the threaded stud about the stud axis in a manner to cause the other of the rotor assembly connection and rotor blade connection to move axially along the stud axis until the rotor blade and the main rotor assembly are in the stowed position.

Another aspect of the present invention is an assembly comprising a helicopter, a blade positioning mechanism, a first retention pin, and a second retention pin. The helicopter has a fuselage including a forward section and a tail section rearward of the forward section, a main rotor assembly extending out from the forward section of the fuselage, and at least one main rotor blade. The main rotor assembly includes a first rotor assembly portion having a retention-pin receiving aperture and a second rotor assembly portion having a retention-pin receiving aperture. The main rotor blade includes a first rotor blade portion having a retention-pin receiving aperture and a second rotor blade portion having a retention-pin receiving aperture. The main rotor blade is adapted to be secured to the main rotor assembly in a deployed position in which the pin-receiving aperture of the first rotor blade portion is aligned with the pin-receiving aperture of the first rotor assembly portion and the pin-receiving aperture of the second rotor blade portion is aligned with the pin-receiving aperture of the second rotor assembly portion. The blade positioning mechanism comprises a rotor assembly connection adapted for connection to the main rotor assembly, a rotor blade connection adapted for connection to the rotor blade, and a threaded stud. The rotor assembly connection includes a pin-receiving aperture adapted to be aligned with the pin-receiving aperture of the second rotor assembly portion when the rotor assembly connection is connected to the main rotor assembly. The rotor blade connection includes a pin-receiving aperture adapted to be aligned with the pin-receiving aperture of the second rotor blade portion when the rotor blade connection is connected to the rotor blade. The threaded stud has a longitudinal central stud axis, a threaded outer surface, and a journal portion journaled to one of the rotor assembly connection and the rotor blade connection for rotation of the threaded stud relative to said one of the rotor assembly connection and the rotor blade connection. The other of the rotor assembly connection and the rotor blade connection has a female knuckle threadably engaging the threaded outer surface of the threaded stud such that rotating the treaded stud about the stud axis causes the other of the rotor assembly connection and rotor blade connection to move axially along the stud axis. The first retention pin extends through the pin-receiving aperture of the rotor assembly connection of the blade positioning mechanism and the pin-receiving aperture of the second rotor assembly portion of the main rotor assembly to connect the rotor assembly connection to the main rotor assembly. The pin-receiving aperture of the rotor assembly connection is aligned with the pin-receiving aperture of the second rotor assembly portion. The second retention pin extends through the pin-receiving aperture of the rotor blade connection of the blade positioning mechanism and the pin-receiving aperture of the second rotor blade portion of the rotor blade to connect the rotor blade connection to the rotor blade. The pin-receiving aperture of the rotor blade connection is aligned with the pin-receiving aperture of the second rotor blade portion.

Another aspect of the present invention is a blade positioning mechanism for folding a helicopter main rotor blade attached to a main rotor assembly. The main rotor blade includes first and second pin-receiving openings adapted to align with first and second pin-receiving openings of the main rotor assembly. The pin-receiving openings of the main rotor blade and the main rotor assembly are sized and adapted for receiving retention pins when the first and second pin-receiving openings of the main rotor blade are aligned with the first and second pin-receiving openings of the main rotor assembly. The blade positioning mechanism comprises a rotor assembly connection, a rotor blade connection, a threaded stud, and a lock mechanism. The rotor assembly connection has a pin-receiving opening sized and adapted for receiving a retention pin to enable the rotor assembly connection to be pinned to the main rotor assembly when the pin-receiving opening of the rotor assembly connection is aligned with the first pin-receiving opening of the main rotor assembly. The rotor blade connection has a pin-receiving opening. The pin-receiving opening is sized and adapted for receiving a retention pin to enable the rotor blade connection to be pinned to the main rotor blade when the pin-receiving opening of the rotor blade connection is aligned with the first pin-receiving opening of the main rotor blade. One of the rotor assembly connection and the rotor blade connection constitutes a first connection. The other of the rotor assembly connection and the rotor blade connection constitutes a second connection. The threaded stud has a longitudinal central stud axis, a threaded outer surface, and a journal portion journaled to the first connection for rotation of the threaded stud relative to the first connection. The second connection has a female knuckle threadably engaging the threaded outer surface of the threaded stud such that rotating the treaded stud about the stud axis causes the second connection to move axially along the stud axis. The lock mechanism is connected to the first connection. The lock mechanism is moveable relative to the first connection between a locked position and an unlocked position. The locked position is a position in which the lock mechanism engages the threaded stud in a manner to prevent rotation of the threaded stud relative to the first connection. The unlocked position is a position in which the lock mechanism is disengaged from the threaded stud to permit rotation of the threaded stud relative to the first connection.

Another aspect of the present invention is a method comprising providing a helicopter and providing a blade attachment mechanism. The helicopter has a fuselage including a forward section and a tail section rearward of the forward section, a main rotor assembly extending out from the forward section of the fuselage, at least one main rotor blade coupled to the main rotor assembly, and a removable link. The rotor blade has first and second rotor blade portions. The rotor assembly has first and second rotor assembly portions. The first rotor blade portion is adapted for attachment to the first rotor assembly portion via a pin. The second rotor blade portion is adapted for attachment to the second rotor assembly portion via another pin. The removable link comprises a blade connection portion and a rotor assembly connection portion. The rotor assembly connection portion is spaced from the blade connection portion. The first rotor assembly portion is pinned to the rotor assembly connection portion via a first retention pin at a first pin axis. The first rotor blade portion is pinned to the blade connection portion via a second retention pin at a second pin axis. The rotor blade is moveable relative to the main rotor assembly between a second portion attachment position and a spaced position. The second portion attachment position is a position in which the second rotor blade portion is adjacent the second rotor assembly portion. The spaced position is a position in which the second rotor blade portion is spaced a distance from the second rotor assembly portion. The rotor blade pivots about at least one of the first and second pin axes when the rotor blade is moved relative to the main rotor assembly between the second portion attachment position and the spaced position. The blade attachment mechanism has a pin-engaging portion and a handle portion extending from the pin-engaging portion. The pin-engaging portion is sized and adapted to simultaneously engage the first and second retention pins when the first and second retention pins are located relative to the rotor blade and the rotor assembly at the first and second pin axes. The method further comprises engaging the first and second retention pins with the pin-engaging portion in a manner such that the handle extends generally laterally away from the first and second pin axes when the rotor blade is in the spaced position, and applying a force to the handle to exert forces on the retention pins in a manner to at least assist in moving the rotor blade from the spaced position to the second portion attachment position.

Other features and advantages will be in part apparent and in part pointed out hereinafter.

BRIEF DESCRIPTION OF THE DRAWINGS

FIG. 3 is a top plan view showing six helicopters of FIG. 1 stowed in a cargo region of an airplane, each helicopter having its main rotor blades in its stowed position;

FIG. 4 is a side elevational view of the cargo region and the six helicopters of FIG. 3;

FIG. 7 is a longitudinal cross-sectional view of a blade retention pin assembly of the present invention, the blade retention pin assembly being in a first position;

FIG. 8 is a longitudinal cross-sectional view of the blade retention pin assembly of FIG. 7, but showing the blade retention pin assembly in a second position;

Corresponding reference characters indicate corresponding parts throughout the several views of the drawings.

DETAILED DESCRIPTION OF THE PREFERRED EMBODIMENTS

Figure 1:
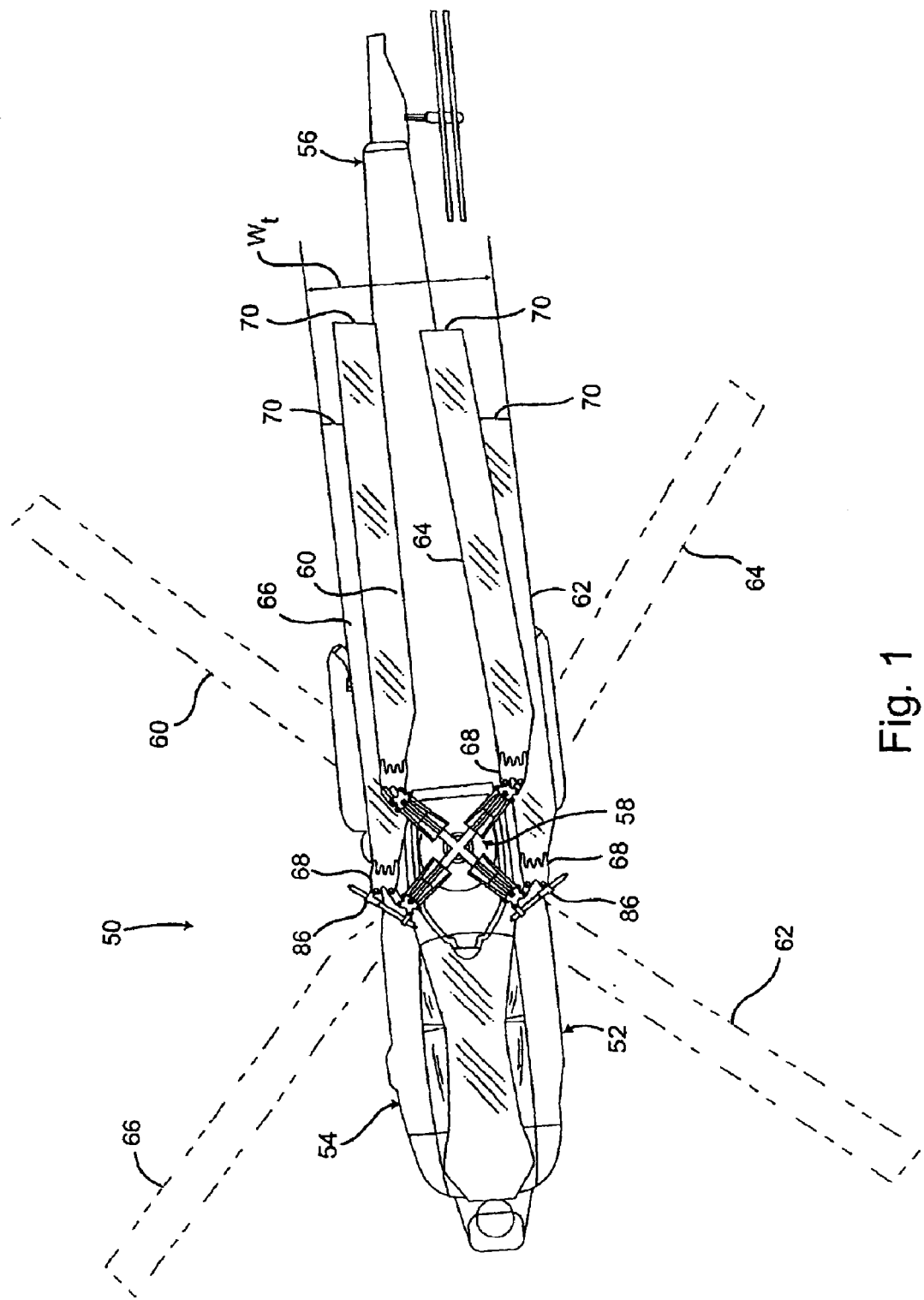
FIG. 1 is a top plan view of a helicopter having a main rotor assembly and four main rotor blades, the main rotor blades being shown in solid folded to a stowed position in accordance with a method of the present invention, the main rotor blades also being shown in phantom in a deployed position, two of the main rotor blades being forward rotor blades and two of the main rotor blades being aft rotor blades.
Figure 2:
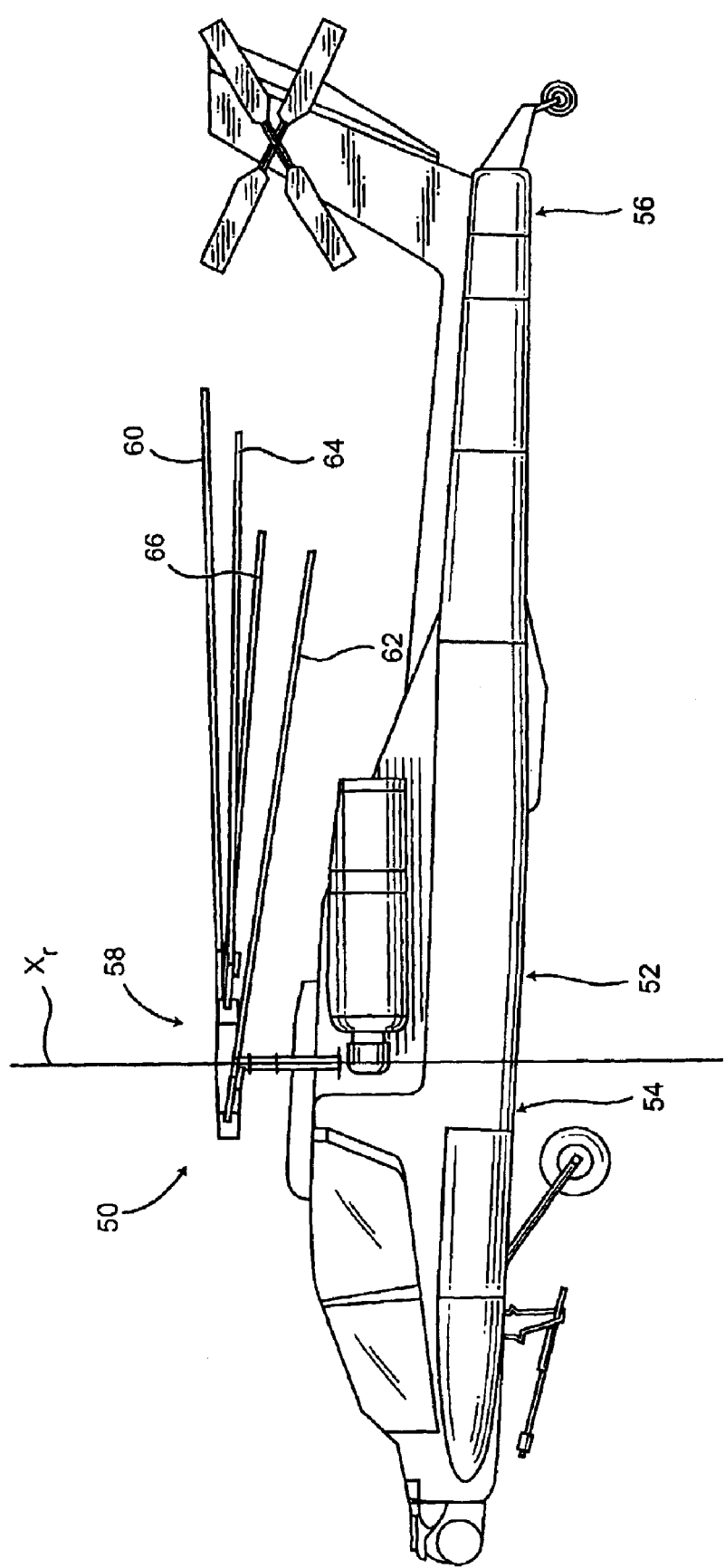
FIG. 2 is a side elevational view of the helicopter of FIG. 1, but without showing the rotor blades in phantom.

Referring now to the drawings, and more particularly to FIGS. 1 and 2, a helicopter is indicated in its entirety by the reference numeral 50. The helicopter 50 is preferably an Apache military helicopter, currently manufactured by The Boeing Corporation (formerly manufactured by Boeing's predecessor McDonnell Douglas Corporation). The helicopter 50 has a fuselage, generally indicated at 52, including a forward section 54 and an aft section 56 rearward of the forward section, a main rotor assembly (i.e., main rotor hub), generally indicated at 58, extending out from the forward section of the fuselage, and four main rotor blades coupled to the main rotor assembly. The four main rotor blades comprise a first rotor blade 60, a second rotor blade 62, a third rotor blade 64, and a fourth rotor blade 66. FIGS. 1 and 2 show the main rotor blades 60, 62, 64, 66 in solid lines in a stowed position (described in greater detail below) for stowage and transportation of the helicopter. Preferably, the main rotor blades 60, 62, 64, 66 are folded to their stowed positions to the extent and in the manner disclosed in U.S. patent application Ser. No. 10/328,567 (incorporated herein by reference), entitled TAIL BOOM SADDLE FOR MAINTAINING HELICOPTOR MAIN ROTOR BLADES IN A STOWED CONFIGURATION FOR HELICOPTER STOWAGE AND TRANSPORT, filed the same date as the present application, and assigned to the assignee of the present patent application. FIG. 1 also shows the main rotor blades in phantom lines representative of a deployed position. The deployed position is a position in which the main rotor blades are attached to the main rotor assembly 58 in an orientation such that the helicopter 50 is ready for flight operations. Each main rotor blade has a length of at least twenty feet and more preferably about twenty-one feet. Each main rotor blade has a root end 68, adapted for attachment to the main rotor assembly 58, and a tip end 70. The root end 68 of each blade comprises a blade root fitting 72 having a pair of pin-receiving apertures for attachment of the blade to the main rotor assembly 58. The main rotor assembly 58 is adapted for rotation about a main rotor axis $X_r$. The main rotor assembly 58 is of a size such that when the blade root fitting 72 of one of the rotor blades is attached to the main rotor assembly, the root end 68 is approximately thirty-six inches from the main rotor axis $X_r$. When the main rotor blades are in their deployed positions, the main rotor blades have a blade rotor diameter of approximately forty-eight feet. In other words, when in the deployed position, each tip end is approximately twenty-four feet from the main rotor axis $X_r$. The fuselage has a length of approximately 49 feet. When the main rotor blades are in their deployed positions, each main rotor blade is secured to the main rotor assembly via two blade pins (not shown).

FIGS. 3 and 4 show six of the helicopters 50 stowed in a cargo region 80. The cargo region 80 is preferably the cargo region of an airplane, and more preferably the cargo region of a C-5 Galaxy military cargo airplane, generally indicated at 82, currently manufactured by Lockheed Martin Corporation (formerly manufactured by Lockheed Martin's predecessor Lockheed Corporation). Because of the largeness of the structural envelopes of the helicopters 50, the helicopters, with their main rotor blades coupled to their main rotor assemblies, can be placed within the cargo region 80 of the C-5 Galaxy airplane 82 only if the main rotor blades are folded to their stowed positions. The six helicopters 50 are preferably positioned relative to each other such that all six of the helicopters are simultaneously contained within a parallelepiped region preferably having a height of less than fifteen feet, a width of less than twenty feet, and a length of less than one hundred forty five feet. More preferably, the parallelepiped region has a height of not greater than thirteen feet, a width of not greater than eighteen feet, and a length of not greater than one hundred forty two feet. The C-5 Galaxy airplane's cargo region 82 has a width of 216 inches (eighteen feet), a height of 156 inches (thirteen feet), and a length of approximately 1700 inches (142 feet). However, the C-5 Galaxy airplane's cargo region is not in the shape of a parallelepiped. It is to be understood that the discussion concerning the parallelepiped is not to be construed as the shape of any cargo region itself, but rather is used as a convenient way to express a volume which completely contains the six helicopters. Although placing the six helicopters 50 in the cargo region 80 of the C-5 Galaxy airplane 82 might mean that the six helicopters are entirely within the cargo region and are also entirely within the parallelepiped described above, the parallelepiped is not necessarily completely contained by the cargo region and the cargo region is not necessarily completely contained by the parallelepiped.

The stowed positions of the four main rotor blades 60, 62, 64, 66 are best shown in FIG. 1. As shown, the first and third rotor blades 60, 64 are aft rotor blades and the third and fourth rotor blades 62, 66 are forward rotor blades. It is to be understood that the determination of the blades as being forward or aft blades is made only before the folding operation occurs. The two rearward-most blades become the aft blades and the two forward-most blades become the forward blades. When in the deployed position, the first rotor blade 60 extends radially outwardly from the main rotor assembly 58 generally in a first direction, the second rotor blade 62 extends radially outwardly from the main rotor assembly generally in a second direction opposite the first direction such that the tip end of the second rotor blade is at least forty seven feet from the tip end of the first rotor blade (and as described above is more preferably at least forty-eight feet from the tip end of the first rotor blade), the third rotor blade 64 extends radially outwardly from the main rotor assembly generally in a third direction, and the fourth rotor blade 66 extends radially outwardly from the main rotor assembly generally in a fourth direction opposite the third direction such that the tip end of the fourth rotor blade is at least forty-seven feet (and more preferably at least forty-eight feet) from the tip end of the third rotor blade. When the four main rotor blades 60, 62, 64, 66 are in their stowed positions, the rotor blades extend generally rearwardly from the main rotor assembly 58 in a manner such that none of the tip ends 70 is spaced from any of the other of the tip ends a distance greater than ten feet. More preferably, when the main rotor blades 60, 62, 64, 66 are in their stowed positions no portion of any blade tip end 70 is greater than ten feet from any portion of any of the other blade tip ends. Even more preferably, when the main rotor blades 60, 62, 64, 66 are in their stowed positions no portion of any blade tip end 70 is greater than one hundred fifteen inches from any portion of any of the other blade tip ends. In the example shown in FIG. 1, in the stowed position the left-most tip end is the tip end 70 of the second rotor blade 64 (i.e., the left forward rotor blade) is spaced a distance $W_t$ from the right-most tip end is the tip end 70 of the fourth rotor blade (i.e., the right forward rotor blade). Preferably, the distance $W_t$ is not greater than ten feet and more preferably not greater than one hundred fifteen inches.

Before the main rotor blades 60, 62, 64, 66 are moved from their deployed positions to their stowed positions, the main rotor assembly 58 is preferably restrained against flapping movement by the methods and apparatus described in U.S. Pat. No. 5,951,259 (entitled Helicopter Flap Lock Assembly and issued Sep. 14, 1999), incorporated herein in its entirety.

Figure 5:
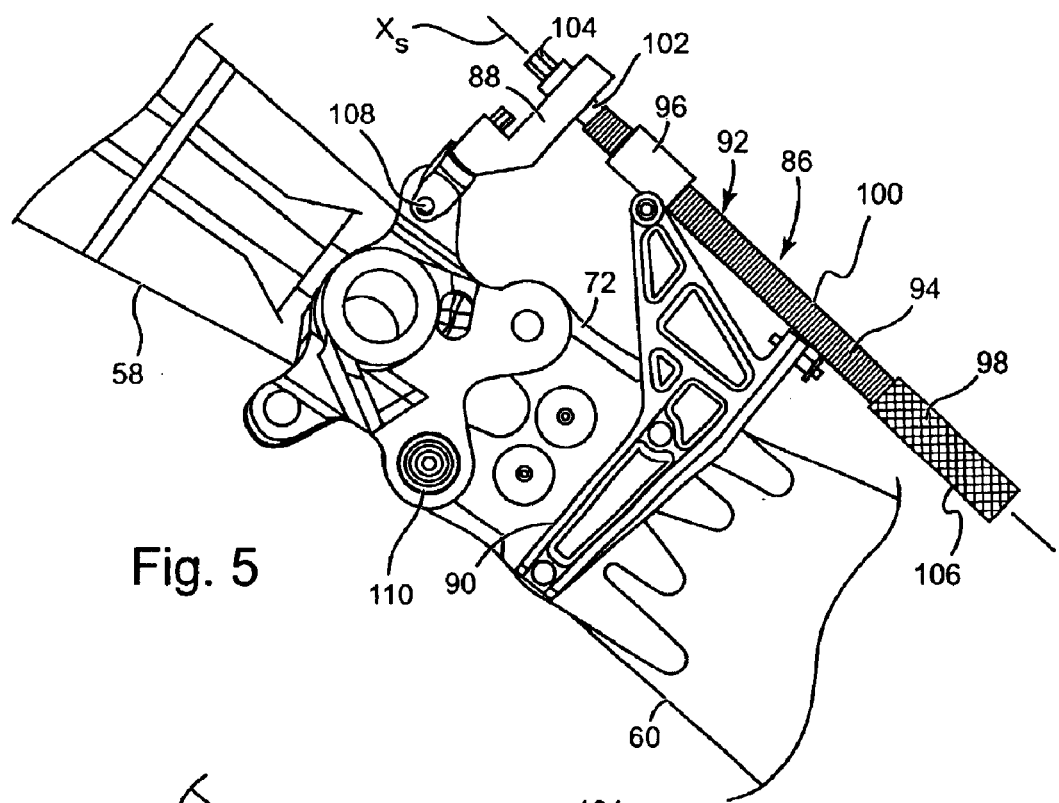
FIG. 5 is an enlarged fragmented top plan view showing a blade positioning mechanism in accordance with the present invention connected to one of the aft rotor blades of the helicopter of FIG. 1 and connected to the main rotor assembly, the aft rotor blade being shown in its deployed position but connected to the main rotor assembly with only one blade pin.
Figure 6:
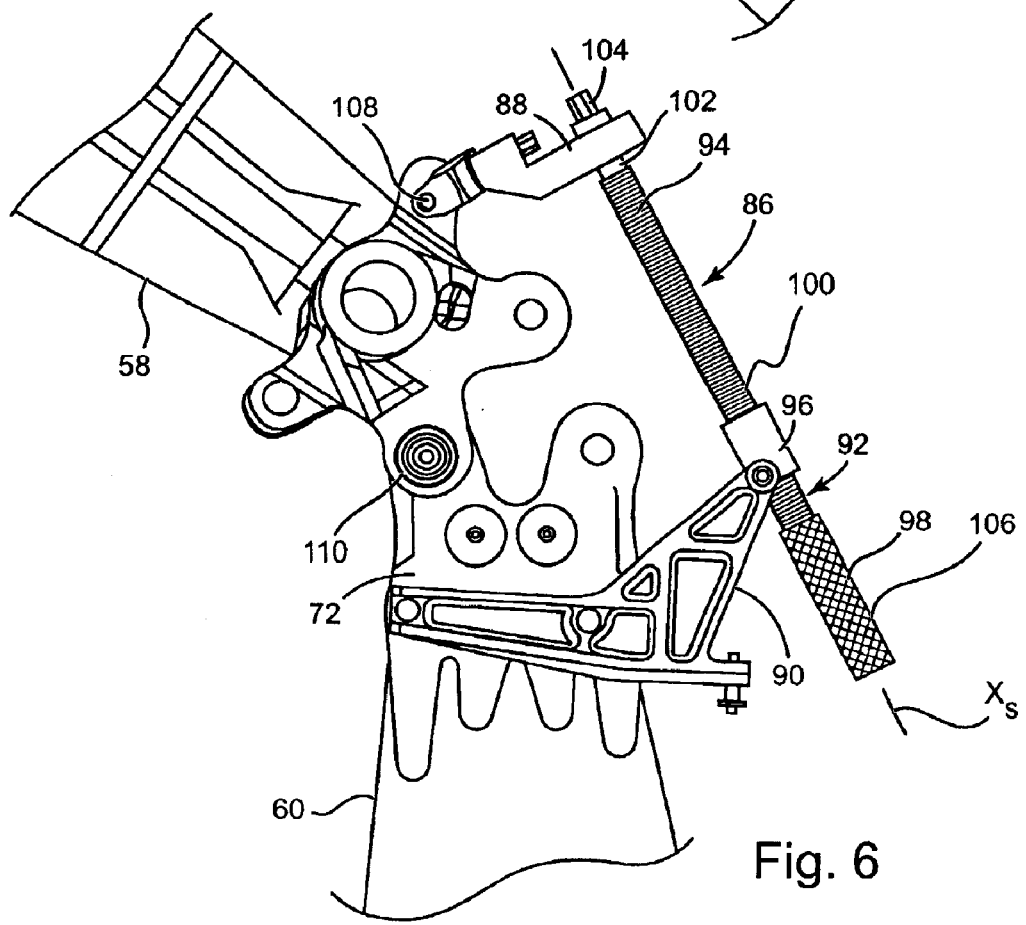
FIG. 6 is an enlarged fragmented top plan view similar to that of FIG. 5, but showing the aft rotor blade folded to its stowed position.

To move the main rotor blades 60, 62, 64, 66 from their deployed positions to their stowed positions, the first and third rotor blades 60, 64 (i.e., the aft rotor blades) are first folded to their stowed positions and then the second and fourth rotor blades 62, 66 (i.e., the forward rotor blades) are folded to their stowed positions. Referring to FIGS. 5 and 6, the aft rotor blades 60, 64 may be folded from their deployed positions to their stowed positions via a rotor blade positioning mechanism, generally indicated at 86. With respect to the aft rotor blades, the blade folding operation of only the first rotor blade 60 is described herein in detail. However, it is to be understood that the described blade folding operation is equally applicable to the third rotor blade 64.

The blade positioning mechanism 86 is similar to the blade positioning mechanism described in U.S. Pat. No. 6,213,712, incorporated herein by reference and operates in the same manner. The blade positioning mechanism 86 includes a rotor assembly connection 88, a rotor blade clamp 90, and a clamp positioner, generally indicated at 92. The rotor assembly connection 88 is adapted to temporarily attach to the main rotor assembly 58 with two degrees of freedom relative to the main rotor assembly. The rotor blade clamp 90 is adapted to temporarily clamp to the rotor blade 60. The clamp positioner 92 is attached to the rotor blade clamp 90 and the rotor assembly connection 88 and is adapted to pivot with two degrees of freedom relative to the rotor blade clamp. The clamp positioner 92 is adapted to position the rotor blade clamp 90 a distance from the rotor assembly connection 88 after removal of one of the blade pins. The clamp positioner 92 comprises a threaded stud 94, a female knuckle 96, and a handle 98. The threaded stud 94 has a longitudinal central stud axis $X_s$, a threaded outer surface 100, and a journal portion 102 preferably journaled to a bearing housing of the rotor assembly connection 88 for rotation of the threaded stud relative to the rotor assembly connection about the stud axis. One end of the threaded stud 94 terminates in a hex nut 104, preferably a ¾ inch hex nut, that is engageable with a hand tool, such as a wrench or a power tool for turning the stud about the stud axis $X_s$. Preferably the threaded outer surface 100 of the threaded stud 94 is an ACME thread. The female knuckle 96 has an internal thread (not shown) which engages the threaded outer surface 100 of the threaded stud 94. The female knuckle 96 is attached to the rotor blade clamp 90 in a manner such that rotating the threaded stud about the stud axis $X_s$ causes the female knuckle and the rotor blade clamp to move axially along the stud axis. The handle 98 is connected to the threaded stud 94 in a manner such that the female knuckle 96 is between the journal portion 102 and the handle. Also, the handle 98 is preferably keyed to the threaded stud 94 such that the handle 98 is fixed to and rotates with the threaded stud. The handle 98 is adapted to enable a user to grasp the handle and rotate the threaded stud 94 about the stud axis $X_s$ without engaging the threaded outer surface 100 of the stud. Preferably, the handle 98 includes a knurled outer surface 106 to facilitate gripping of the handle.

As shown in FIGS. 5 and 6, the rotor blade clamp 90 of the rotor blade positioning mechanism 86 is detachably clamped to the blade root fitting 72 of the first rotor blade 60 and the rotor assembly connection 88 is detachably attached to a stud 108 of the main rotor assembly 58. FIG. 5 shows the first rotor blade 60 in its deployed position but connected to the main rotor assembly with only one blade retention pin 110 (described below in detail). FIG. 6 shows the first rotor blade 60 in its stowed position. The first rotor blade 60 is folded between its deployed position (FIG. 5) and stowed position (FIG. 6) by turning the threaded stud 94 about the stud axis $X_s$. As the rotor blade 60 is folded between its deployed and stowed position, it is pivoted about an axis of the retention pin 110. A rotor blade handling pole (not shown in FIGS. 5 and 6) is preferably detachably secured to an intermediate portion of the first rotor blade 60 and extends downward to enable a person on the ground to exert a tangential force against the first rotor blade to thereby assist in moving the first rotor blade between its deployed and stowed positions. Although not shown, it is to be understood that the third rotor blade 64 is moved between its deployed and stowed positions in substantially the same manner as the first rotor blade 64.

It is to be understood that the blade root fitting 72 of each of the main rotor blades 60, 62, 64, 66 includes two pin-receiving apertures and the rotor assembly 58 includes four pairs of pin-receiving apertures. When the helicopter 50 is ready for flight operations, the pin-receiving apertures of each rotor blade are aligned with a corresponding one of the pairs of pin-receiving apertures of the rotor assembly 58, and flight pins (not shown) extend through the aligned apertures to secure each rotor blade to the rotor assembly. However, to fold the main rotor blades from their deployed positions to their stowed positions, at least some of the flight pins must be removed. To facilitate rapid deployment of the helicopter, it is desirable to replace at least some of the flight pins with the retention pin assemblies 110. It is to be understood, however, that the retention pin assemblies 110 must ultimately be replaced with the flight pins before the helicopter 50 is ready for flight.

Referring now to FIGS. 7 and 8, the blade retention pin 110 (or retention pin assembly) comprises a pin shank 112, a pin handle 114, and a bolt 116. The shank 112 has a shank axis (or pin axis) $X_p$. Preferably, one end of the bolt 116 is fixed to the pin handle 114 and the other end of the bolt includes a bolt head 118. Preferably, the bolt head 118 includes a hexagonal recess 120 such that the head comprises a 7/16 inch socket. The shank 112 preferably includes coaxial first and second bores 122, 124 extending along the pin axis $X_p$. The first bore 122 has a smaller diameter than that of the second bore 124. The diameter of the first bore 122 is sufficiently large to enable the bolt 116 to slide in the first bore, but is smaller than the bolt head 118. The diameter of the second bore 124 is sufficiently large to enable passage of the bolt head 118 as the bolt 116 is slid in the first bore 122. The bolt 116 extends through the first bore 122 of the shank 112$X_p$ The bolt 116 operatively connects the pin handle 114 to the shank 112 for movement of the pin handle relative to the shank generally along the shank axis $X_p$ between an extended (or first) position (FIG. 7) and a retracted (or second) position (FIG. 8) axially spaced from the extended position. The retention pin assembly 110 further includes opposing first and second surfaces and opposing third and fourth surfaces. The first surface is a shank-engageable surface 126 of the handle 114. The second surface is a handle-engageable surface 128 of the shank 112. The third surface is a bolt-head engageable shoulder 130 of the shank 112. The fourth surface is a shank-shoulder engageable surface 132 of the bolt head 118. The shank-engageable surface 128 of the handle 114 is spaced from the handle-engageable surface 128 of the shank 112 when the handle is in its extended position (FIG. 7). The shank-engageable surface 128 of the handle 114 abuts the handle-engageable surface 128 of the shank 112 when the handle is in its retracted position (FIG. 8). The bolt-head engageable shoulder 130 of the shank 112 abuts the shank-shoulder engageable surface of the bolt head 118 when the handle 114 is in its extended position. The bolt-head engageable shoulder 130 of the shank 112 is spaced from the shank-shoulder engageable surface 132 of the bolt head 118 when the handle 114 is in its extended position. The retention pin assembly 110 is configured such that movement of the handle 114 and the bolt 116 relative to the pin shank 112 along the shank axis $X_p$ from the extended position (FIG. 7) to the retracted position (FIG. 8) causes the shank-engageable surface 126 of the handle 114 to collide with the handle-engageable surface 128 in a manner to force the pin shank 112 along the shank axis $X_p$ in a pin insertion (or first) direction (i.e., from left to right as viewed in FIGS. 7 and 8). The retention pin assembly 110 is configured such that movement of the handle 114 and bolt 116 relative to the pin shank 112 along the shank axis $X_p$ from the retracted position (FIG. 8) to the extended position (FIG. 7) causes the shank-shoulder engageable surface 132 of the bolt head 118 to collide with the bolt-head engageable shoulder 130 of the shank 112 in a manner to force the shank along the shank axis in a pin removal (or second) direction (i.e., from right to left as viewed in FIGS. 7 and 8) opposite the pin insertion direction.

The configuration of the retention pin assembly 110 facilitates rapid insertion and removal of the pin shank 112 into two aligned pin-receiving apertures of a main rotor blade and the main rotor assembly. To insert the pin shank 112 into the aligned apertures, rapid movement of the handle 114 and bolt 116 along the shank axis in the pin insertion direction causes the handle to hammer the pin shank into the aligned apertures. With the pin shank 112 so inserted, the pin shank connects the main rotor blade to the main rotor assembly. To remove the pin shank 112 from the aligned apertures, rapid movement of the handle 114 and bolt 116 along the shank axis in the pin removal direction causes the bolt head 118 to collide with the bolt-head engageable shoulder 130 of the pin shank to force the pin shank out of the aligned apertures.

Figure 9:
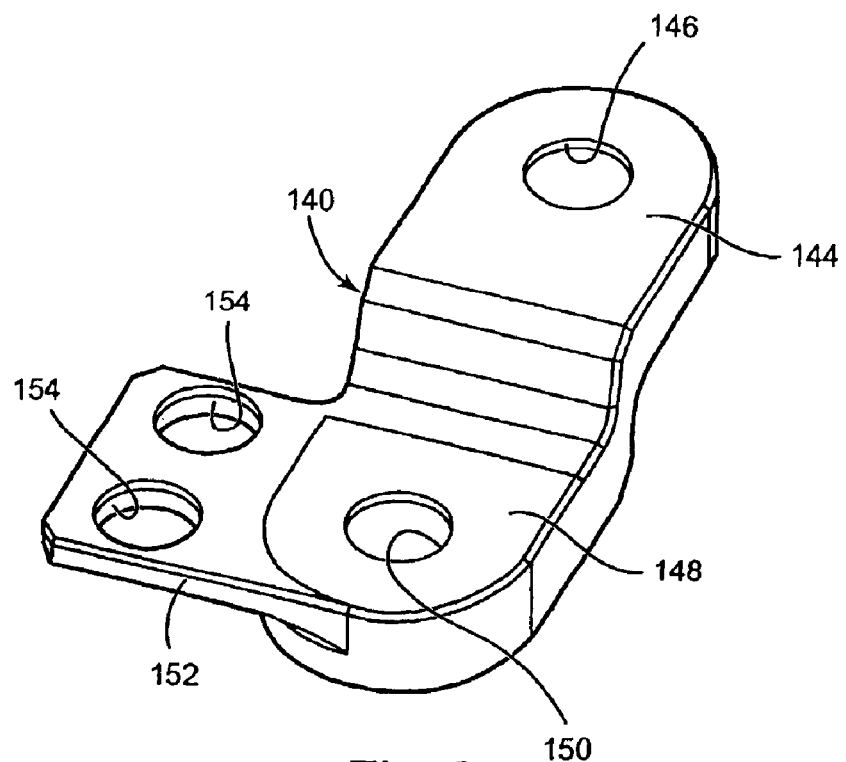
FIG. 9 is a perspective view of a right-handed blade fold positioning block of the present invention, the right-handed blade fold positioning block being adapted for securing the right aft rotor blade of the helicopter of FIG. 1 in its stowed position.
Figure 10:
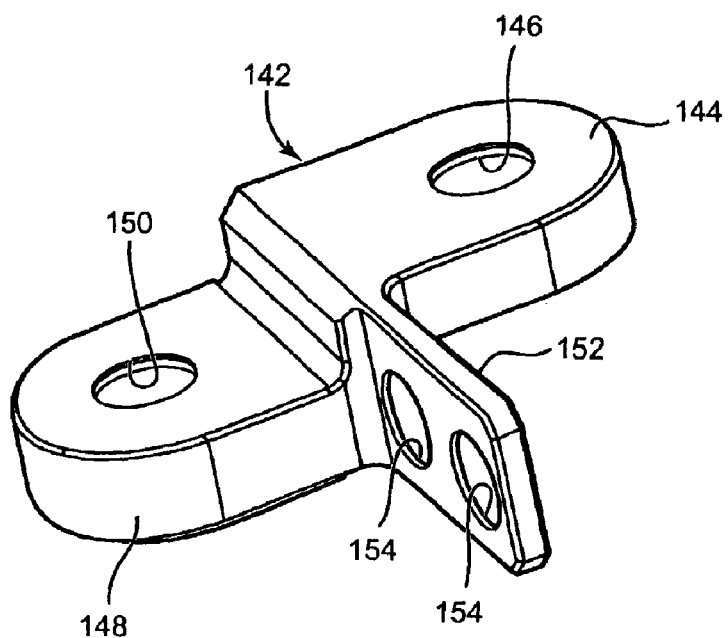
FIG. 10 is a perspective view of a left-handed blade fold positioning block of the present invention, the left-handed blade fold positioning block being adapted for securing the left aft rotor blade of the helicopter of FIG. 1 in its stowed position.

FIG. 9 shows a right-handed blade fold positioning block 140 and FIG. 10 shows a left-handed blade fold positioning block 142. The right-handed blade fold positioning block 140 is adapted for securing the first rotor blade 60 (i.e., the right aft rotor blade) in its stowed position. The left-handed blade fold positioning block 142 is adapted for securing the third rotor blade 60 (i.e., the left aft rotor blade) in its stowed position. Each positioning block includes a blade connection portion 144 having a blade connection aperture 146, a rotor assembly connection portion 148 having a rotor connection aperture 150, and a flight pin stow portion 152 having two flight pin stow ports 154 for receiving flight pins 160 (shown in FIG. 11). The blade connection portion 144 of each block 140, 142 is adapted to be connected to its corresponding rotor blade via a retention pin extending through the blade connection aperture 146 and the blade root fitting 72 of the rotor blade. The rotor assembly connection portion 148 of each block 140, 142 is adapted to be connected to the main rotor assembly 58 via a retention pin extending through the rotor connection aperture 150 and one of the pin-receiving apertures of the main rotor assembly.

Figure 11:
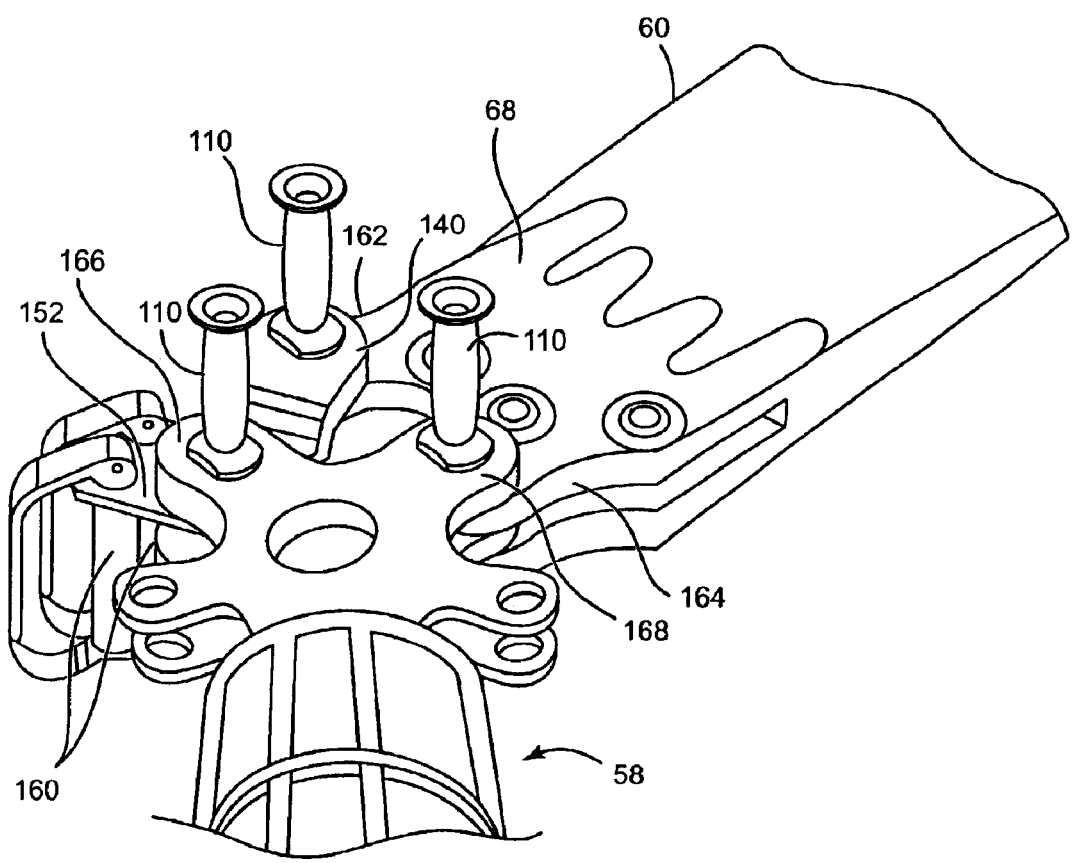
FIG. 11 is an enlarged fragmented perspective view showing the right-handed blade fold positioning block of FIG. 9 securing the right aft blade of FIG. 6 in its stowed position.

The right-handed blade fold positioning block 140 is shown in FIG. 11 locking the first rotor blade 60 relative to the main rotor assembly 58 in the first rotor blade's stowed position. Three retention pins (which are preferably three retention pin assemblies 110 of FIGS. 7 and 8) are used in the assembly of FIG. 11. The blade root fitting 72 of the first rotor blade 60 includes an outside blade portion 162 having a pin-receiving aperture (not shown) and an inside blade portion 164 having a pin-receiving aperture (not shown).

The rotor assembly 58 includes an outside rotor assembly portion 166 having a pin-receiving aperture (not shown) and an inside rotor assembly portion 168 having a pin-receiving aperture (not shown). When the first rotor blade 60 is in its deployed position and ready for flight (not shown), the pin-receiving apertures of the outside blade portion 162 and the outside rotor assembly portion 166 are aligned with one another and receive one of the flight pins 160. Likewise, when the first rotor blade 60 is in its deployed position and ready for flight, the pin-receiving apertures of the inside blade portion 164 and the inside rotor assembly portion 168 are aligned with one another and receive the other of the flight pins 160. However, when the first rotor blade 60 is in its stowed position as shown in FIG. 11, a first one of the retention pin assemblies 110 extends through the pin-receiving aperture of the outside blade portion 162 and through the blade connection aperture 146 of the right-handed blade fold positioning block 140, a second one of the retention pin assemblies 110 extends through the pin-receiving aperture of the outside rotor assembly portion 166 of the rotor assembly 58 and through the rotor assembly connection aperture 150 of the right-handed blade fold positioning block 140, and the flight pins 160 extend through the flight pin stow ports 154. The right-handed blade fold positioning block 140 is preferably secured to the main rotor assembly 58 and the first rotor blade 60 while the rotor blade positioning mechanism 86 of FIG. 6 is holding the first rotor blade 60 in its stowed position. After the right-handed blade fold positioning block 140 is secured to the main rotor assembly 58 and the first rotor blade 60, the rotor blade positioning mechanism 86 may be detached from both the main rotor assembly and the first rotor blade. Thus, the right-handed blade fold positioning block 140 maintains the first rotor blade 60 in its stowed position even after detachment of the rotor blade positioning mechanism 86. Although not shown connecting the third rotor blade 64 to the main rotor assembly 58, it is to be understood that the left-handed blade fold positioning block 142 functions in substantially the same manner as the right-handed blade fold positioning block 140. Thus, the described operation of the right-handed blade fold positioning block 140 is equally applicable to the operation of the left-handed blade fold positioning block 142.

After the aft rotor blades (i.e., the first and third rotor blades 60, 64) have been folded rearwardly to their stowed positions, the forward rotor blades (i.e., the second and fourth rotor blades 62, 66) may be folded to their stowed position. However, if the forward rotor blades would be folded in the same manner as the aft rotor blades, the configuration of the rotor assembly 58 would prevent the forward rotor blades from being folded sufficiently to enable more than four of the Apache helicopters 50 to fit in the cargo region 50 of the C-5 Galaxy military cargo airplane. To enable the forward rotor blades to be folded to the desired stowed position, a swing link, generally indicated at 170 (FIG. 12), and an auxiliary blade positioning mechanism, generally indicated at 172 (FIG. 13), are provided.

Figure 12:
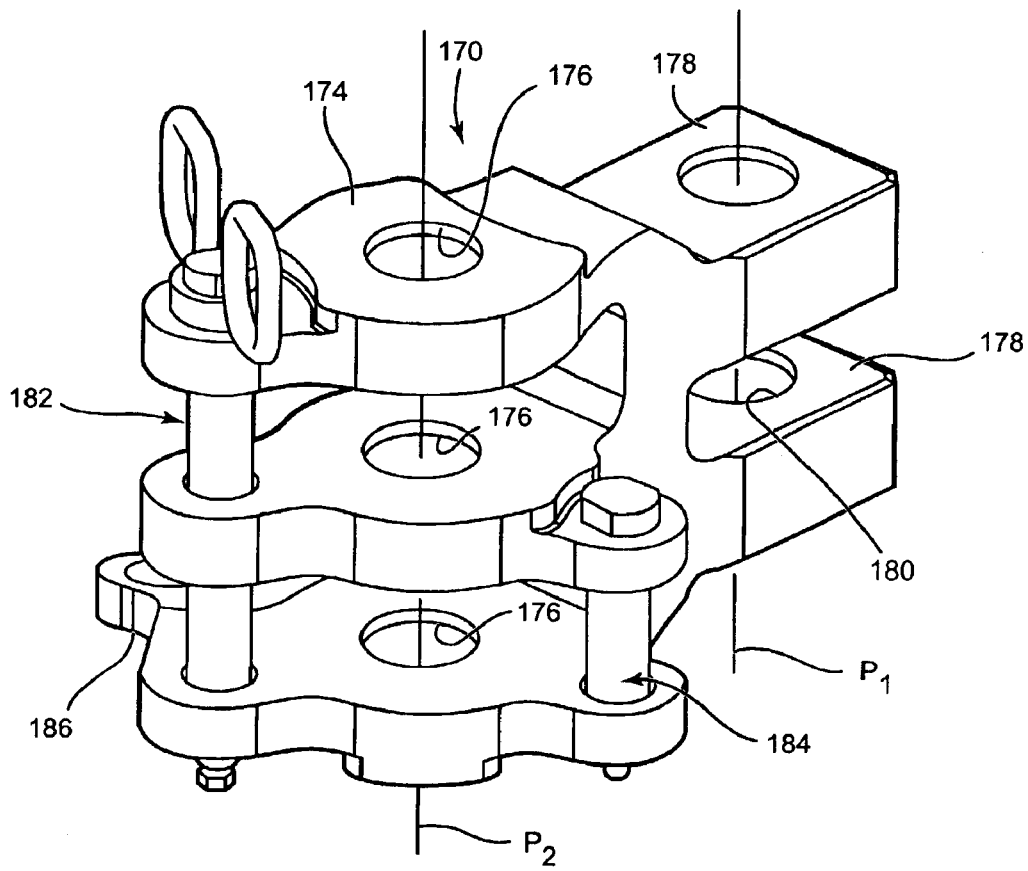
FIG. 12 is a perspective view of a swing link of the present invention, the swing link being adapted to facilitate positioning of one of the forward rotor blades of FIG. 1 in its stowed position.

Referring to FIG. 12, the swing link 170 comprises a blade connection portion 174 having a blade pin-receiving aperture 176, and a rotor assembly connection portion 178 having a rotor pin-receiving aperture 180. The blade connection portion 178 preferably comprises three knuckles for connection to the blade root fitting 72 of the fourth rotor blade 66 (FIG. 14) and the blade pin-receiving aperture 176 extends through all three knuckles. The rotor assembly connection portion 178 preferably comprises two knuckles for connection to the main rotor assembly 58 and the rotor pin-receiving aperture 180 extending through the two knuckles. The rotor pin-receiving aperture 180 is laterally spaced from the blade pin-receiving aperture 176. As discussed in detail below with reference to FIGS. 14–17, as the fourth rotor blade 66 is moved from its deployed position to its stowed position it will pivot about a first pivot axis $P_1$ through the rotor pin-receiving aperture 180 and then pivot about a second pivot axis $P_2$ through the blade pin-receiving aperture 176. The swing link 170 further includes a removable anchor pin 182, a fixed anchor pin 184, and a thumb screw receiving opening 186. The removable anchor pin 182 and fixed anchor pin 184 are adapted to abut opposite portions of the blade root fitting 72 of the fourth rotor blade 66 to prevent movement of the swing link 170 relative fourth rotor blade as the fourth rotor blade is pivoted about the first pivot axis $P_1$. Preferably, each of the removable anchor pin 182 and the fixed anchor pin 184 has a tubular sheath, preferably of nylon or other suitable material, surrounding a shank of the pin. The tubular sheaths help protect the blade root fitting 72 of the fourth rotor blade 66 from being damaged by the shanks of the anchor pins 182, 184. Removal of the removable anchor pin 182 permits the fourth rotor blade 66 to pivot relative to the swing link 170 about the second pivot axis $P_2$. As discussed below, the thumb screw receiving opening 186 of the swing link 170 is adapted to be detachably secured to the rotor assembly 56 to prevent movement of the swing link relative to the rotor assembly as the fourth rotor blade is pivoted about the second pivot axis $P_2$.

Figure 13:
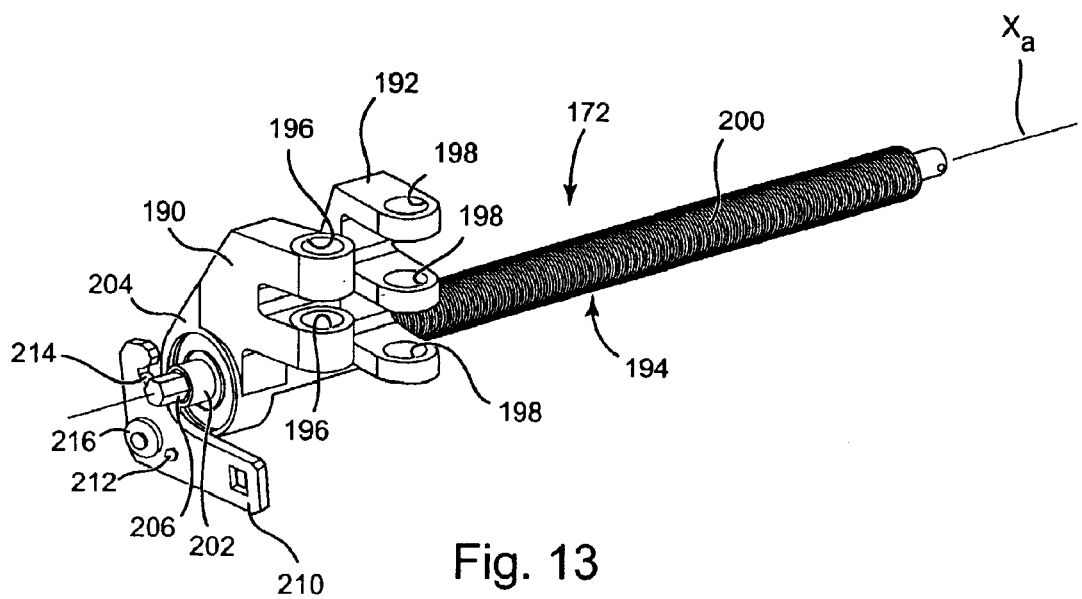
FIG. 13 is a perspective view of an auxiliary rotor blade positioning mechanism of the present invention, the auxiliary blade positioning mechanism being adapted to move the right forward rotor blade of FIG. 1 to its stowed position.

Referring to FIG. 13, the auxiliary blade positioning mechanism 172 comprises a rotor assembly connection 190 adapted for connection to the main rotor assembly 58 (not shown in FIG. 13), a rotor blade connection 192 adapted for connection to the blade root fitting 72 of the fourth rotor blade 66 (not shown in FIG. 13), and a threaded stud 194. The rotor assembly connection 190 has a rotor pin-receiving aperture 196 and the rotor blade connection 192 has a blade pin-receiving aperture 198. The threaded stud 194 has a longitudinal central stud axis $X_a$, a threaded outer surface 200, and a journal portion 202 preferably journaled to a bearing housing 204 of the rotor assembly connection 190 for rotation of the threaded stud relative to the rotor assembly connection about the stud axis. One end of the threaded stud 194 terminates in a hex nut 206, preferably a ¾ inch hex nut, that is engageable with a hand tool, such as a wrench or a power tool for turning the stud about the stud axis $X_a$. Preferably the threaded outer surface 200 of the threaded stud 194 is an ACME thread. The rotor blade connection 192 preferably includes a female knuckle 208 having an internal thread (not shown) which engages the threaded outer surface 200 of the threaded stud 194 in a manner such that rotating the threaded stud about the stud axis $X_a$ causes the rotor blade connection 192 to move axially along the stud axis.

Preferably, the auxiliary blade positioning mechanism 172 also includes a lock mechanism 210 pivotally connected to the rotor assembly connection 190 via a shoulder bolt 212. The lock mechanism 210 includes a hex-nut engaging portion 214 adapted to detachably engage the hex nut 206 of the stud 194. The lock mechanism 210 is adapted to pivot about the shoulder bolt between an unlocked position (shown in FIG. 13) and a locked position (not shown). In the unlocked position, the hex-nut engaging portion 214 of the lock mechanism 210 is spaced from the hex nut 206 of the threaded stud 194 such that the lock mechanism 210 does not interfere with the rotation of the threaded stud about the stud axis $X_a$. In the locked position (not shown), the hex-nut engaging portion 214 of the lock mechanism 210 engages the hex nut 206 of the threaded stud 194 in a manner to prevent rotation of the threaded stud relative to the rotor assembly connection 190. A quick-release pit pin 216 detachably fixes the lock mechanism 210 to the rotor assembly connection 190 so that the lock mechanism may be detachably fixed to the rotor assembly connection in both the locked and unlocked positions. Preferably, the auxiliary blade positioning mechanism 172 also includes a flight-pin stow portion 218 (FIGS. 15–17) extending from the rotor blade connection 192. The flight-pin stow portion 218 includes two flight pin stow ports for receiving flight pins (not shown) used to secure one of the forward rotor blades to the main rotor assembly 58. The Operation of the auxiliary blade positioning mechanism 172 is discussed in greater detail below with respect to FIGS. 15–17.

Figure 14:
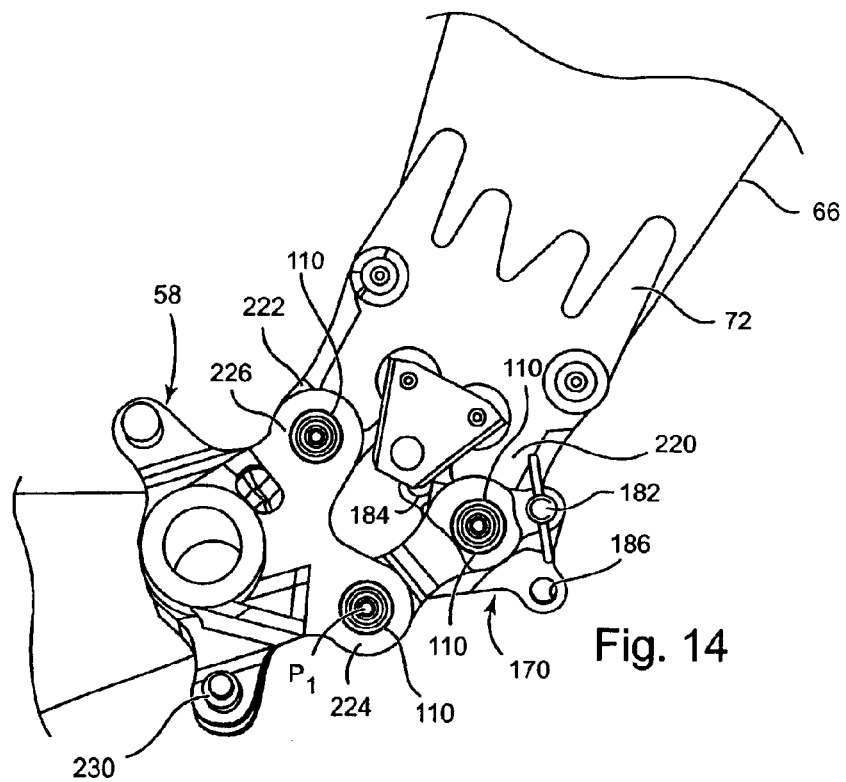
FIG. 14 is a top plan view of the right forward rotor blade of FIG. 1 pivoted forward to a swing-link receiving position and having the swing link of FIG. 12 attached to the right forward rotor blade and the main rotor assembly.

In FIG. 14, the fourth rotor blade 66 (i.e., the right front main rotor blade) is in a position forward of the rotor blade's deployed position. The blade root fitting 72 of the fourth rotor blade 66 includes a first rotor blade portion 220 having a pin-receiving opening (not shown) and a second rotor blade portion 222 having a pin-receiving opening (not shown). The main rotor assembly 58 includes a first rotor assembly portion 224 having a pin-receiving opening (not shown) and a second rotor assembly portion 226 having a pin-receiving opening (not shown). When the fourth rotor blade 66 is in its deployed position (not shown in FIG. 14): (a) the pin-receiving opening of the first rotor blade portion 220 is aligned with the pin-receiving opening of the first rotor assembly portion 224 and secured together by a retention pin extending through the openings; and (b) the pin-receiving opening of the second rotor blade 222 is aligned with the pin-receiving opening of the second rotor assembly portion 226 and secured together by a retention pin extending through the openings. FIG. 14 shows the fourth rotor blade 66 in a swing-link receiving position, i.e., a position in which the first rotor blade portion 220 is laterally spaced from the first rotor assembly portion 224 a distance for receiving the swing link 170. With the fourth rotor blade 66 is in the swing-link receiving position: (a) the blade pin-receiving aperture 176 of the swing link 170 is aligned with the pin-receiving opening of the first rotor blade portion 220 and secured thereto preferably via a blade retention pin 110; (b) the rotor pin-receiving aperture 180 of the swing link 170 is aligned with the pin-receiving opening of the first rotor assembly portion 224 and secured thereto preferably via another blade retention pin 110. In moving the fourth rotor blade 66 from its deployed position to the swing-link receiving position (FIG. 14), the fourth rotor blade 66 preferably pivots relative to the main rotor assembly 58 about a blade retention pin 110 extending through the pin-receiving opening of the second rotor blade portion 222 and through the pin-receiving opening of the second rotor assembly portion 226. Although not shown, it is to be understood that the fourth rotor blade 66 is preferably moved from the deployed position to the swing-link receiving position via the rotor blade positioning mechanism 86 of FIGS. 5 and 6. When the fourth rotor blade 66 is in the swing-link receiving position and the swing link 170 is attached to the fourth rotor blade and the main rotor assembly 58, the swing link's removable anchor pin 182 and fixed anchor pin 184 both abut against the blade root fitting 72 of the fourth rotor blade to lock the swing link to the blade root fitting to thereby prevent relative movement between the swing link and the blade root fitting.

Figure 15:
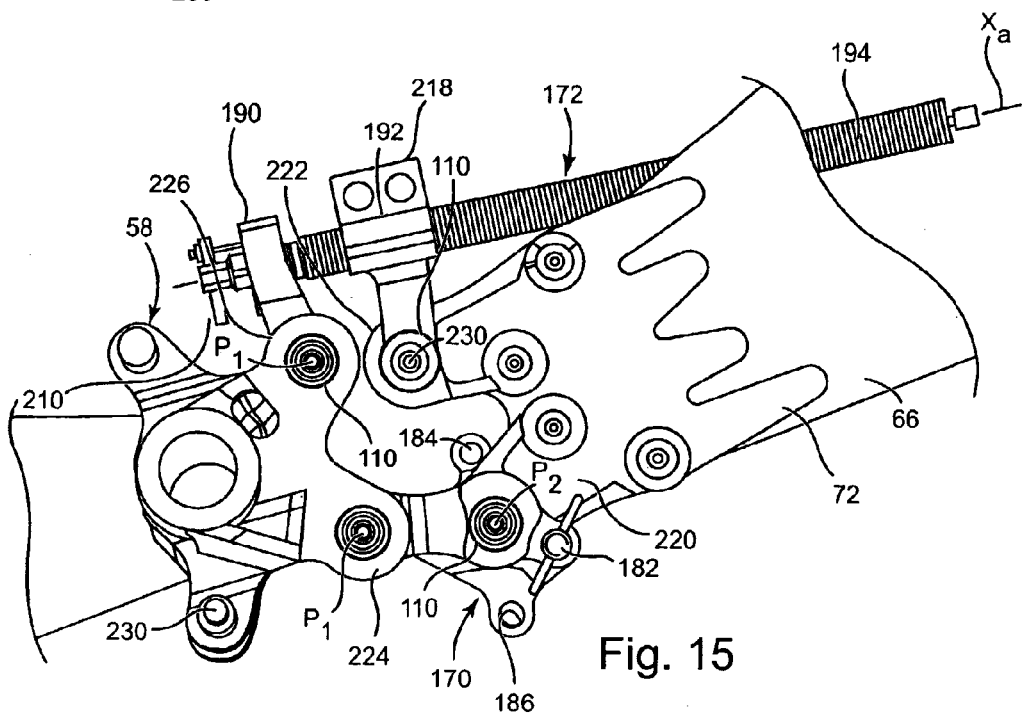
FIG. 15 is a top plan view similar to that of FIG. 14 but showing the right forward rotor blade pivoted rearwardly about a first pivot axis of the swing link to a blade positioning mechanism receiving position and having the auxiliary blade positioning mechanism of FIG. 13 attached to the right forward rotor blade and the main rotor assembly.

After attachment of the swing link 170, the retention pin 110 securing the second rotor blade portion 222 to the second rotor assembly portion 226 is removed and the fourth rotor blade 66 and swing link are pivoted rearwardly about the first pivot axis $P_1$ to a blade positioning mechanism receiving position (shown in FIG. 15). The blade positioning mechanism receiving position is a position in which the pin-receiving opening of the second rotor blade portion 222 is spaced a sufficient distance from the pin-receiving opening of the second rotor assembly portion 226 to enable connection of the auxiliary blade positioning mechanism 172 of FIG. 13 to the second rotor blade portion and the second rotor assembly portion. As shown in FIG. 15, the rotor pin-receiving aperture 196 of the auxiliary blade positioning mechanism 172 is aligned with the pin-receiving opening of the second rotor assembly portion 226 and one of the retention pins 110 extends through the aligned openings along a first mechanism pin axis $M_1$. Likewise, the blade pin-receiving aperture 198 of the auxiliary blade positioning mechanism 172 is aligned with the pin-receiving opening of the second rotor blade portion 222 of the fourth rotor blade 66 and one of the retention pins 110 extends through the aligned openings along a second mechanism pin axis $M_2$. Although not shown, it is to be understood that the fourth rotor blade 66 is preferably moved from the position shown in FIG. 14 to the blade positioning mechanism receiving position shown in FIG. 15 via the rotor blade positioning mechanism 86 of FIGS. 5 and 6. In moving the fourth rotor blade 66 from the position shown in FIG. 14 to the blade positioning mechanism receiving position shown in FIG. 15, the fourth rotor blade 66 and swing link 170 preferably pivot relative to the main rotor assembly 58 about the first pivot axis $P_1$.

Figure 16:
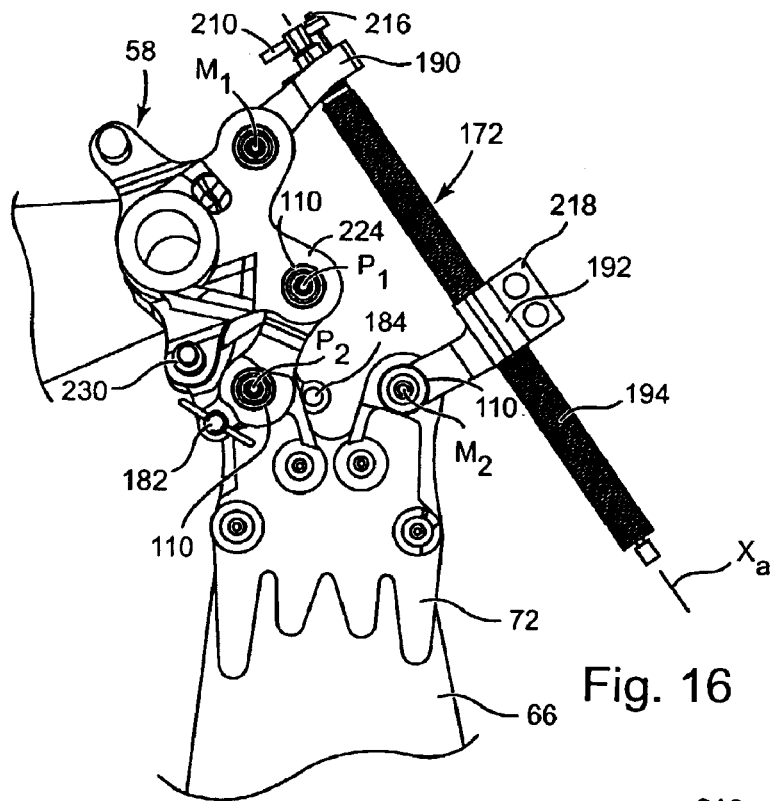
FIG. 16 is a top plan view similar to that of FIG. 15 but showing the right forward rotor blade pivoted about the first pivot axis of the swing link to a swing-link/rotor lock position where further movement about the first pivot axis is prevented.
Figure 17:
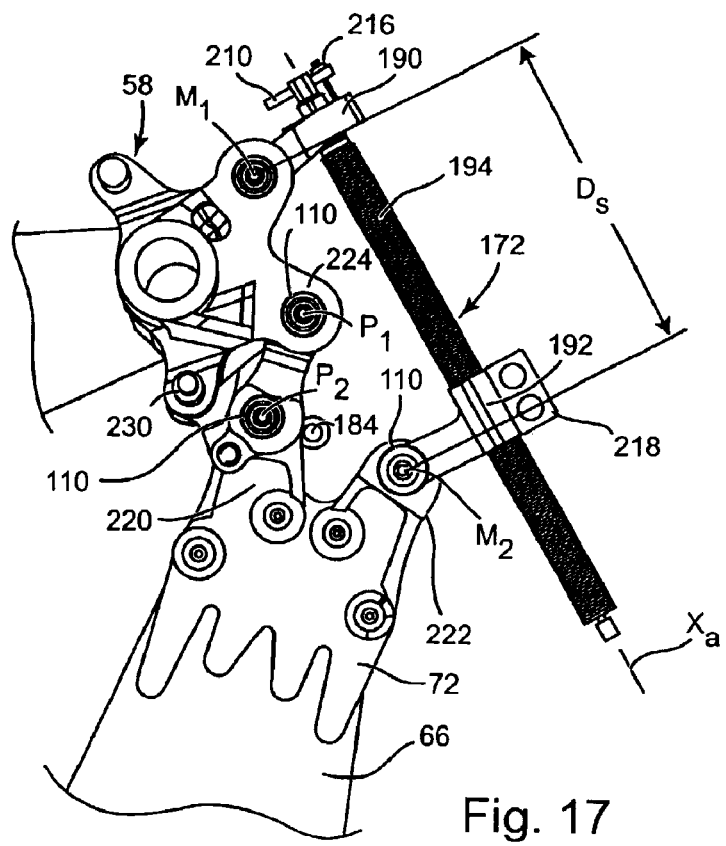
FIG. 17 is a top plan view similar to that of FIG. 16 but showing the right forward rotor blade pivoted about a second pivot axis of the swing link to the right forward rotor blade's stowed position.

After attachment of the auxiliary blade positioning mechanism 172, the rotor blade positioning mechanism 86 is removed and the threaded stud 194 of the auxiliary blade positioning mechanism is rotated about the auxiliary stud axis $X_a$ to move the fourth rotor blade 66 from the blade positioning mechanism receiving position (FIG. 15) to a swing-link/rotor-lock position (FIG. 16) and then to the stowed position (FIG. 17). Movement of the fourth rotor blade 66 from the blade positioning mechanism receiving position (FIG. 15) to the swing-link/rotor-lock position (FIG. 16) constitutes a first movement portion. Movement of the fourth rotor blade 66 from the swing-link/rotor-lock position (FIG. 16) to the stowed position (FIG. 17) constitutes a second movement portion. During the first movement portion, the fourth rotor blade 66 and swing link 170 pivot relative to the main rotor assembly 58 about the first pivot axis $P_1$. During the second movement portion, the fourth rotor blade 66 pivots relative to the main rotor assembly 58 and the swing link 170 about the second pivot axis $P_2$.

Referring to FIG. 16, when the fourth rotor blade 66 is in the swing-link/rotor-lock position, the thumb screw receiving opening 186 is aligned with and receives a thumb screw 230 attached to the main rotor assembly 58 to detachable fix the swing link 170 to the main rotor assembly. After the swing link 170 is so detachably fixed to the main rotor assembly 58, the removable anchor pin 182 is removed from the swing link 170 to unlock the fourth rotor blade 66 from the swing link and thereby permit the fourth rotor blade to pivot relative to the swing link 170 about the second pivot axis $P_2$ upon further movement of the rotor blade connection 192 of the auxiliary blade position mechanism 172 along the stud axis $X_a$.

Referring now to FIG. 17, after the swing link 170 is locked to the main rotor assembly 58 via the thumb screw 230 and after the removable anchor pin 182 is removed from the swing link, further rotation of the threaded stud 194 of the auxiliary blade positioning mechanism 172 moves the rotor blade connection 192 along the stud axis to thereby move the fourth rotor blade 66 along the second movement portion to the stowed position (FIG. 17). As stated above, the fourth rotor blade 66 pivots relative to the main rotor assembly 58 and the swing link 170 about the second pivot axis $P_2$ during the second movement portion. The rotor assembly connection 190 of the auxiliary blade positioning mechanism 172 pivots relative to the second rotor assembly portion 226 of the main rotor assembly 58 about the first mechanism pin axis $M_1$ throughout the first and second movement portions. Likewise, the rotor blade connection 192 of the auxiliary blade positioning mechanism 172 pivots relative to the second rotor blade portion 222 of the fourth rotor blade 66 about the second mechanism pin axis $M_2$ throughout the first and second movement portions. When the fourth rotor blade 66 is in its stowed position, the first mechanism pin axis $M_1$ is spaced from the second mechanism pin axis $M_2$ a distance $D_s$. Also, after the fourth rotor blade 66 is moved to its stowed position, the lock mechanism 210 of the auxiliary blade positioning mechanism 172 is moved to its locked position to prevent further rotation of the threaded stud 194 about the stud axis $X_a$.

Although not shown in detail, it is to be understood that second rotor blade 62 (i.e., the left forward rotor blade) is folded to its stowed position in a manner similar to that of the fourth rotor blade 66, except the folding operation of the second rotor blade is a mirror image of that of the fourth rotor blade. Thus, the description of the folding operation of the fourth rotor blade 66 is equally applicable to the second rotor blade. After all four main rotor blades 60, 62, 64, 66 are folded to their stowed position, the helicopter 50 may be stowed and transported for later rapid deployment. Preferably, the hammer-type retention pins 110 hold the rotor blades in their stowed positions together with the other mechanisms used for securing the rotor blades to the main rotor assembly 58. The retention pins 110 help enable the blades to be rapidly deployed from their stowed position to their deployed position.

Although not shown, it is to be understood that a rotor blade handling pole is preferably used to assist in moving each main rotor blade between its deployed and stowed positions. The blade handling pole is detachably secured to an intermediate portion of the rotor blade to be moved and extends downward to enable a person on the ground to exert a tangential force against the rotor blade to thereby assist in moving the rotor blade between its deployed and stowed positions. It is also to be understood that the rotor blade handling poles are also preferably used to maintain the rotor blades in their stowed positions. In particular, during stowage and transportation of the helicopter 50, the rotor blade handling pole is secured at one of its ends to the rotor blade and secured at its other end to the helicopter's tail boom via a tail boom saddle (not shown) detachably secured to the helicopter's tail boom.

Figure 18:
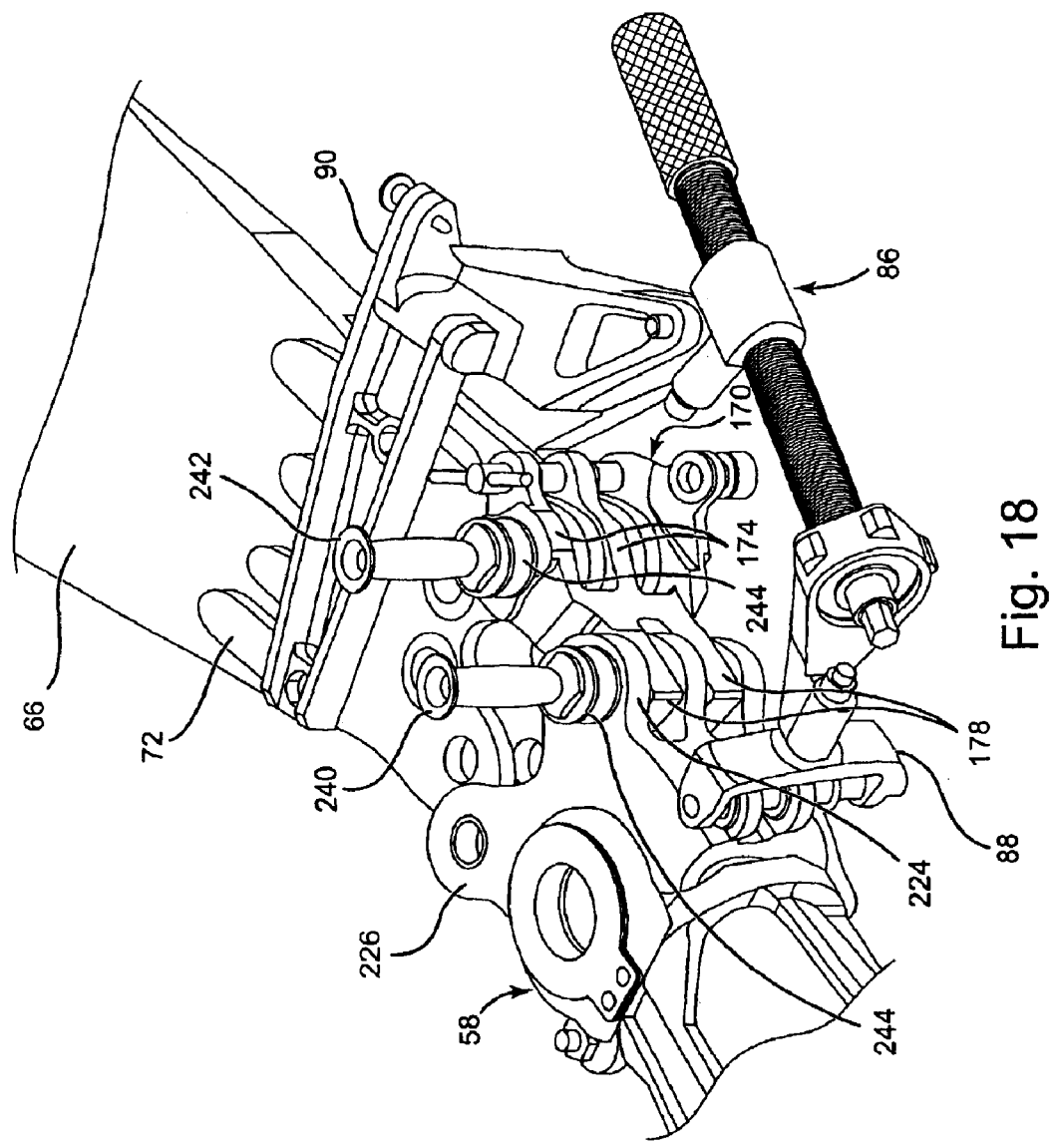
FIG. 18 is a perspective view of the right forward blade being moved back toward its deployed position.

To deploy the stowed helicopter 50, the main rotor blades 60, 62, 64, 66 are moved from their stowed positions to their deployed positions. The steps described above for moving the blades from their deployed positions to their stowed positions are performed in reverse order. In general, to deploy the stowed helicopter, the forward rotor blades 62, 66 are first moved from their stowed positions to their deployed positions, and then the aft rotor blades 60, 64 are moved from their stowed positions to their deployed positions. The auxiliary blade positioning mechanism 172 is used to move the right forward rotor blade 66 from its stowed position (FIG. 17) to swing-link/rotor lock position (FIG. 16) and then to the blade positioning mechanism receiving position (FIG. 15). With the right forward rotor blade 66 in the blade positioning mechanism receiving position, the rotor blade positioning mechanism 86 is attached to both the rotor blade and the main rotor assembly and then the auxiliary blade positioning mechanism 172 is detached. Referring to FIG. 18, the rotor blade positioning mechanism 86 is then operated to further swing the right forward rotor blade 66 forward toward the swing link receiving position (FIG. 14).

Figure 19:
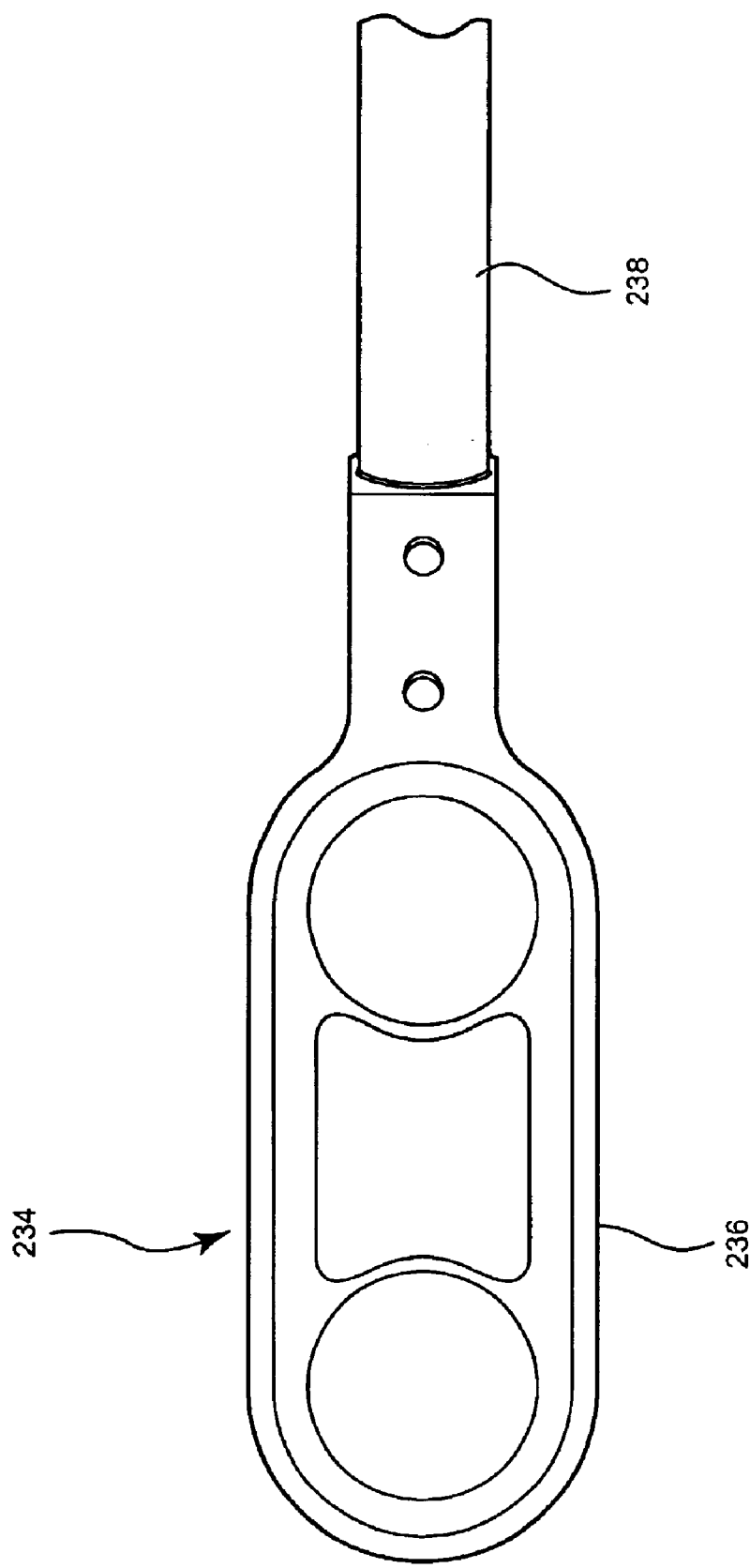
FIG. 19 is a perspective view of blade alignment mechanism adapted to simultaneously engage a pair of blade retention pins to assist a user in moving the forward rotor blades of the helicopter of FIG. 1 to their deployed positions.

FIG. 18 shows the right front rotor blade 66, the main rotor assembly 58, and the swing link 170 just before the rotor blade is aligned with the main rotor assembly in the swing link receiving position. It is often difficult to align the pin-receiving aperture of the second rotor blade portion 222 of the rotor blade 66 with the pin-receiving aperture of the second rotor assembly portion 226 of the rotor assembly 58. Preferably, a blade attachment (or alignment) mechanism 234 (FIG. 19) is used to align the pin-receiving aperture of the second rotor blade portion 222 with the pin-receiving aperture of the second rotor assembly portion 226.

Figure 20:
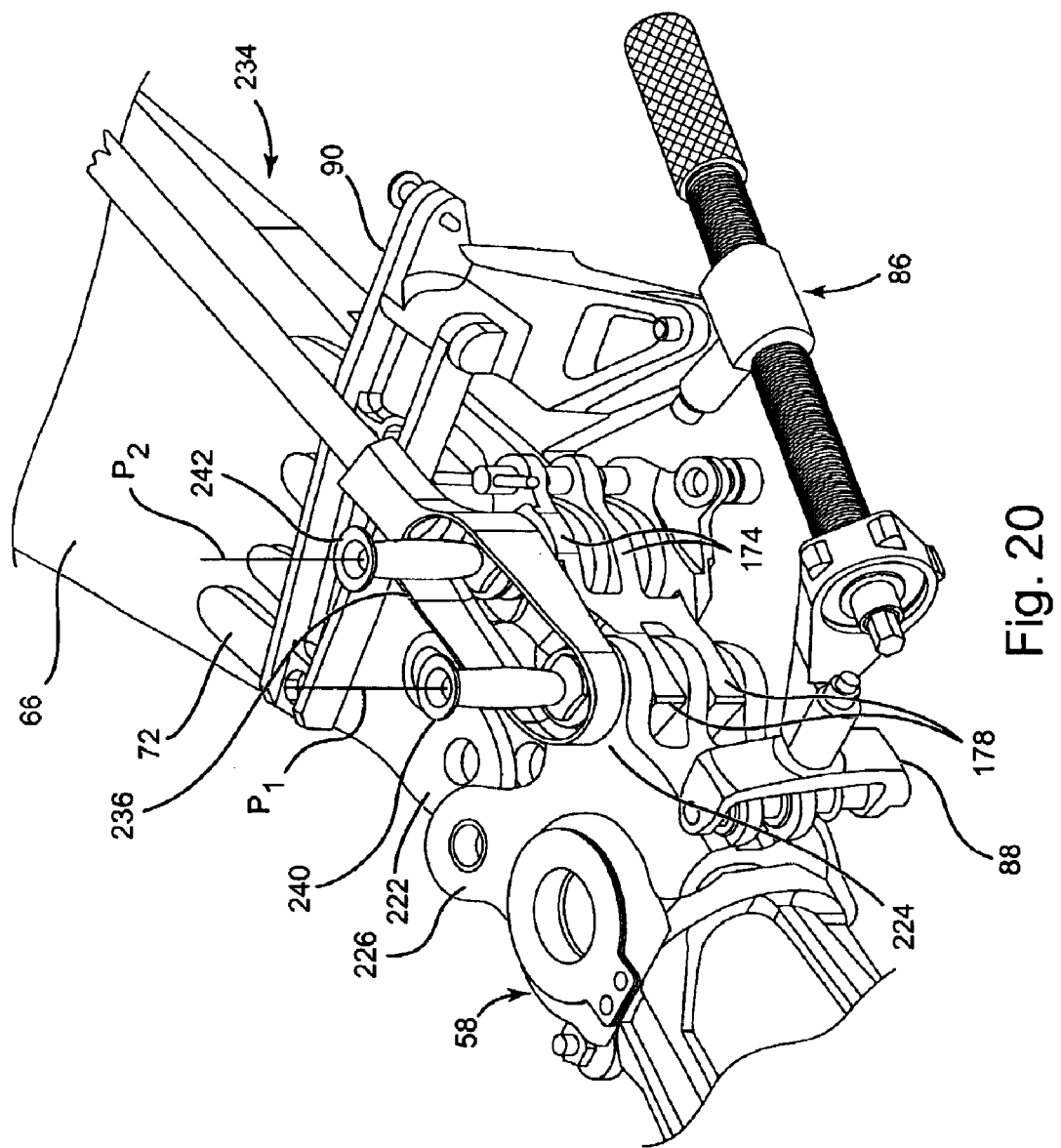
FIG. 20 is a perspective view similar to that of FIG. 18, but showing the blade alignment mechanism of FIG. 18 in engagement with two blade retention pins.

The blade alignment mechanism 234 has a pin-engaging portion 236 and an elongate handle portion 238 extending from the pin-engaging portion. The pin engaging portion 236 is sized and adapted to simultaneously engage first and second blade retention pins 240, 242 (FIGS. 18 and 20). The blade retention pins 240, 242 of FIGS. 18 and 20 are similar to the blade retention pins 110 of FIGS. 7 and 8, but each of the blade retention pins 240, 242 includes a circumferential groove 244 (best shown in FIG. 18) for engaging the blade alignment mechanism 234. if Fig. The first blade retention pin 240 extends through the pin-receiving opening of the first rotor assembly portion 224 and the rotor pin-receiving aperture 180 of the rotor assembly connection portion 178 of the swing link 170. The second blade retention pin 242 extends through the blade pin-receiving aperture 176 of the blade connection portion 174 of the swing link 170 and the pin-receiving opening of the first rotor blade portion 220. Although FIGS. 15–17 show the retention pins as being the blade retention pins 110 of FIGS. 7 and 8, it is to be understood that the blade retention pins 240, 242 are preferably used for securing the swing link 170 to the main rotor assembly 58 and the rotor blade 66. The first retention pin 240 extends along the first pivot axis $P_1$ and the second retention pin 242 extends along the second pivot axis $P_2$.

To use the blade alignment mechanism 234 to align the pin-receiving aperture of the second rotor blade portion 222 with the pin-receiving aperture of the second rotor assembly portion 226, the first and second blade retention pins 240, 242 are first engaged with the pin-engaging portion 236 in the manner shown in FIG. 20, i.e., such that the handle extends generally laterally away from the first and second pivot axes $P_1$, $P_2$, when the rotor blade is in the spaced position. A user then pushes and/or pulls the handle portion 238 of the blade alignment mechanism 234 to exert forces on the retention pins 240, 242 in a manner to at least assist in moving the rotor blade 66 from a spaced position (e.g., FIG. 20) to a position in which the pin-receiving aperture of the second rotor blade portion 222 is aligned with the pin-receiving aperture of the second rotor assembly portion 226. When the pin-receiving aperture of the second rotor blade portion 222 is aligned with the pin-receiving aperture of the second rotor assembly portion 226, a blade retention pin (preferably one of the flight pins) is placed into the aligned apertures to secure the second rotor blade portion to the second rotor assembly portion. After this securement, the swing link 170 is detached and the right forward rotor blade 66 is moved rearwardly (i.e., in a clockwise direction as viewed in FIG. 14) via the rotor blade positioning mechanism 86 to align the pin-receiving aperture of the first rotor blade portion 220 of the rotor blade 66 with the pin-receiving aperture of the first rotor assembly portion 224 of the main rotor assembly 58. When the pin-receiving aperture of the first rotor blade portion 220 is aligned with the pin-receiving aperture of the first rotor assembly portion 224, a blade retention pin (preferably one of the flight pins) is placed into the aligned apertures to secure the first rotor blade portion to the first rotor assembly portion. In this manner, the right forward rotor blade 66 is secured in its deployed position. The left forward rotor blade 62 may also be moved to and secured in its deployed position in a manner similar to (but a mirror image of) the right forward rotor blade 66.

After the forward rotor blades 62, 66 are secured in their deployed positions, the aft rotor blades 60, 64 may be moved from their stowed to their deployed positions by reversing the steps described above in moving the aft rotor bladed from their deployed positions to their stowed positions.

In view of the above, it will be seen that the several objects of the invention are achieved and other advantageous results attained. For example, six Apache helicopters 50 may be placed in a C-5 Galaxy airplane and transported to a deployment site where the helicopters 50 may be rapidly deployed.

As various changes could be made in the above constructions and methods without departing from the scope of the invention, it is intended that all matter contained in the above description or shown in the accompanying drawings shall be interpreted as illustrative and not in a limiting sense. The invention therefore shall be limited solely by the scope of the claims set forth below.

What is claimed is:

1. A blade positioning mechanism for folding a helicopter main rotor blade attached to a main rotor assembly via two blade pins, the mechanism comprising:

a rotor assembly connection adapted to temporarily attach to the main rotor assembly with two degrees of freedom relative to the main rotor assembly;

a rotor blade clamp adapted to temporarily attach to the rotor blade;

a clamp positioner attached to the rotor blade clamp and the rotor assembly connection, the clamp positioner being adapted to pivot with two degrees of freedom relative to the rotor blade clamp and adapted to position the rotor blade clamp a distance from the rotor assembly connection after removal of one of the blade pins, the clamp positioner comprising a threaded stud, a female knuckle, and a handle, the threaded stud having a longitudinal central stud axis, a threaded outer surface, and a journal portion journaled to one of the rotor assembly connection and rotor blade clamp for rotation of the threaded stud relative to said one of the rotor assembly connection and rotor blade clamp about the stud axis, the female knuckle engaging the threaded stud and attached to the other of the rotor assembly connection and rotor blade clamp in a manner such that rotating the threaded stud about the stud axis causes the female knuckle and said other of the rotor assembly connection and rotor blade clamp to move axially along the stud axis, the handle being connected to the threaded stud in a manner such that the female knuckle is between the journal portion and the handle.

2. A blade positioning mechanism as set forth in claim 1 wherein the handle is adapted to enable a user to grasp the handle and rotate the stud about the stud axis without engaging the threaded outer surface of the stud.

3. A blade positioning mechanism as set forth in claim 2 wherein the handle is fixed to the threaded stud in a manner such that rotation of the stud about the stud axis causes rotation of the handle about the stud axis and such that rotation of the handle about the stud axis causes rotation of the stud about the stud axis.

4. A blade positioning mechanism as set forth in claim 2 the handle includes a knurled outer surface.

5. A retention pin assembly comprising a shank and a handle, the shank having a shank axis, the handle being operatively connected to the shank for movement of the handle relative to the shank generally along the shank axis between a first position and a second position, the second position being axially spaced from the first position, the retention pin assembly further including opposing first and second surfaces and opposing third and fourth surfaces, the first surface being spaced from the second surface when the handle is in its first position, the first surface engaging the second surface when the handle is in its second position, the third surface engaging the fourth surface when the handle is in its first position, the third surface being spaced from the fourth surface when the handle is in its second position, the retention pin assembly being configured such that movement of the handle relative to the shank along the shank axis from the first position to the second position causes the first surface to collide with the second surface in a manner to force the shank along the shank axis in a first direction, the retention pin assembly being configured such that movement of the handle relative to the shank along the shank axis from the second position to the first position causes the fourth surface to collide with the third surface in a manner to force the shank along the shank axis in a second direction opposite the first direction.

6. A method comprising:

providing a retention pin assembly as set forth in claim 5;

inserting the shank of the retention pin assembly into at least two aligned apertures in a manner to operatively connect a main rotor blade of a helicopter to a main rotor assembly of the helicopter.

7. An assembly comprising:

a helicopter having a fuselage including a forward section and an aft section rearward of the forward section, a main rotor assembly extending out from the forward section of the fuselage, and four main rotor blades coupled to the main rotor assembly, each of the main rotor blades having a root end and a tip end, the four main rotor blades comprising a first rotor blade, a second rotor blade, a third rotor blade, and a fourth rotor blade, the four main rotor blades being in stowed positions in which each main rotor blade extends generally rearwardly from the main rotor assembly, the root end of the first rotor blade being directly connected to the main rotor assembly, the root end of the third rotor blade being directly connected to the main rotor assembly;

a first swing link mechanism detachably connected to the root end of the second rotor blade and the main rotor assembly, the first swing link spacing the root end of the second rotor blade from the main rotor assembly; and a second swing link mechanism detachably connected to the root end of the fourth rotor blade and the main rotor assembly, the second swing link spacing the root end of the fourth rotor blade from the main rotor assembly.

8. A method comprising:

providing a helicopter having a fuselage including a forward section and a tail section rearward of the forward section, a main rotor assembly extending out from the forward section of the fuselage, and at least one main rotor blade coupled to the main rotor assembly, a first rotor blade portion of the rotor blade being attached to a first rotor assembly portion of the main rotor assembly via a first retention pin, a second, rotor blade portion of the rotor blade being attached to a second rotor assembly portion of the main rotor assembly via a second retention pin;

providing a swing link comprising a blade connection portion and a rotor assembly connection portion, the rotor assembly connection portion being spaced from the blade connection portion;

removing the first retention pin in a manner such that the first retention pin is released from attaching the first rotor blade portion to the first rotor assembly portion;

folding the rotor blade relative to the main rotor assembly from a first portion attachment position to a swing-link receiving position, the first portion attachment position being a position in which the first rotor blade portion is adjacent the first rotor assembly portion, the swing-link receiving position being a position in which the first rotor blade portion is spaced from the first rotor assembly portion a distance for receiving the swing link;

pinning the first rotor assembly portion to the rotor assembly connection portion of the swing link at a first pin axis and pinning the first rotor blade portion to the blade connection portion of the swing link at a second pin axis;

removing the second retention pin in a manner such that the second retention pin is released from attaching the second rotor blade portion to the second rotor assembly portion;

moving the rotor blade relative to the main rotor assembly from a second portion attachment position to a stowed position, the second portion attachment position being a position in which the second rotor blade portion is adjacent the second rotor assembly portion, the stowed position being a position in which the second rotor blade portion is spaced a distance $D_s$ from the second rotor assembly portion, the rotor blade pivots relative to the main rotor assembly about one of the first and second pin axes during at least a portion of the movement of the rotor blade from the second portion attachment position to the stowed position.

9. A method as set forth in claim 8 wherein the entirety of the step of moving the rotor blade from the second portion attachment position to the stowed position occurs after the step of pinning the first rotor assembly portion and the first rotor blade portion to the swing link.

10. A method as set forth in claim 8 wherein the first pin axis is parallel to and spaced from the second pin axis.

11. A method as set forth in claim 8 wherein the movement of the rotor blade from the second portion attachment position to the stowed position comprises a first movement portion and a second movement portion, the rotor blade pivots relative to the main rotor assembly about the first pin axis during the first movement portion, the rotor blade pivots relative to the main rotor assembly about the second pin axis during the second movement portion.

12. A method as set forth in claim 11 wherein the swing link is locked to the rotor blade during the first movement portion in a manner to prevent the rotor blade from pivoting about the second pivot axis during the first movement portion, the swing link being unlocked from the rotor blade during the second movement portion.

13. A method as set forth in claim 12 wherein the swing link is locked to the main rotor assembly during the second movement portion in a manner to prevent the rotor blade from pivoting about the first pivot axis during the second movement portion, the swing link being unlocked from the main rotor assembly during the first movement portion.

14. A method as set forth in claim 8 wherein the step of moving the rotor blade relative to the main rotor assembly from the second portion attachment position to the stowed position comprises moving the rotor blade relative to the main rotor assembly from the second portion attachment position to a blade positioning mechanism receiving position, and moving the rotor blade relative to the main rotor assembly from the blade positioning mechanism receiving position to the stowed position, the method further comprising:

providing a blade positioning mechanism comprising a rotor assembly connection adapted for connection to the main rotor assembly, a rotor blade connection adapted for connection to the rotor blade, and a threaded stud, the threaded stud having a longitudinal central stud axis, a threaded outer surface, and a journal portion journaled to one of the rotor assembly connection and the rotor blade connection for rotation of the threaded stud relative to said one of the rotor assembly connection and the rotor blade connection, the other of the rotor assembly connection and the rotor blade connection having a female knuckle threadably engaging the threaded outer surface of the threaded stud such that rotating the treaded stud about the stud axis causes said other of the rotor assembly connection and rotor blade connection to move axially along the stud axis; and pinning the rotor assembly connection of the blade positioning mechanism to the second rotor assembly portion of the main rotor assembly at a first mechanism pin axis and pinning the rotor blade connection of the blade positioning mechanism to the second rotor blade portion of the rotor blade at a second mechanism pin axis, the pinning of the blade positioning mechanism to the second rotor assembly portion and the second rotor blade portion occurring when the rotor blade and the main rotor assembly are in the blade positioning mechanism receiving position, the blade positioning mechanism receiving position being a position in which the second rotor blade portion is spaced a sufficient distance from the second rotor assembly portion to enable connection of the blade positioning mechanism to the second rotor blade portion and the second rotor assembly portion;

wherein the step of moving the rotor blade relative to the main rotor assembly from the blade positioning mechanism receiving position to the stowed position comprises rotating the threaded stud about the stud axis in a manner to cause said other of the rotor assembly connection and rotor blade connection to move axially along the stud axis.

15. A method as set forth in claim 14 wherein the assembly connection of the blade positioning mechanism pivots relative to the second rotor assembly portion of the main rotor assembly about the first mechanism pin axis when the rotor blade is moved relative to the main rotor assembly from the blade positioning mechanism receiving position to the stowed position, and wherein the rotor blade connection of the blade positioning mechanism pivots relative to the second rotor blade portion of the rotor blade about the second mechanism pin axis when the rotor blade is moved relative to the main rotor assembly from the blade positioning mechanism receiving position to the stowed position.

16. An assembly comprising:
a helicopter having a fuselage including a forward section and a tail section rearward of the forward section, a main rotor assembly extending out from the forward section of the fuselage, and at least one main rotor blade, the main rotor assembly including a first rotor assembly portion having a retention-pin receiving aperture and a second rotor assembly portion having a retention-pin receiving aperture, the main rotor blade including a first rotor blade portion having a retention-pin receiving aperture and a second rotor blade portion having a retention-pin receiving aperture, the main rotor blade being adapted to be secured to the main rotor assembly in a deployed position in which the pin-receiving aperture of the first rotor blade portion is aligned with the pin-receiving aperture of the first rotor assembly portion and the pin-receiving aperture of the second rotor blade portion is aligned with the pin-receiving aperture of the second rotor assembly portion;
a blade positioning mechanism comprising a rotor assembly connection adapted for connection to the main rotor assembly, a rotor blade connection adapted for connection to the rotor blade, and a threaded stud, the rotor assembly connection including a pin-receiving aperture adapted to be aligned with the pin-receiving aperture of the second rotor assembly portion when the rotor assembly connection is connected to the main rotor assembly, the rotor blade connection including a pin-receiving aperture adapted to be aligned with the pin-receiving aperture of the second rotor blade portion when the rotor blade connection is connected to the rotor blade, the threaded stud having a longitudinal central stud axis, a threaded outer surface, and a journal portion journaled to one of the rotor assembly connection and the rotor blade connection for rotation of the threaded stud relative to said one of the rotor assembly connection and the rotor blade connection, the other of the rotor assembly connection and the rotor blade connection having a female knuckle threadably engaging the threaded outer surface of the threaded stud such that rotating the treaded stud about the stud axis causes said other of the rotor assembly connection and rotor blade connection to move axially along the stud axis;
a first retention pin extending through the pin-receiving aperture of the rotor assembly connection of the blade positioning mechanism and the pin-receiving aperture of the second rotor assembly portion of the main rotor assembly to connect the, rotor assembly connection to the main rotor assembly, the pin-receiving aperture of the rotor assembly connection being aligned with the pin-receiving aperture of the second rotor assembly portion; and
a second retention pin extending through the pin-receiving aperture of the rotor blade connection of the blade positioning mechanism and the pin-receiving aperture of the second rotor blade portion of the rotor blade to connect the rotor blade connection to the rotor blade, the pin-receiving aperture of the rotor blade connection being aligned with the pin-receiving aperture of the second rotor blade portion.

17. An assembly as set forth in claim 16 wherein the blade positioning mechanism further comprises a lock mechanism connected to said one of the rotor assembly connection and the rotor blade connection, the lock mechanism being adapted to pivot relative to said one of the rotor assembly connection and the rotor blade connection between a locked position and an unlocked position, the locked position being a position in which the lock mechanism engages the threaded stud in a manner to prevent rotation of the threaded stud relative to said one of the rotor assembly connection and the rotor blade connection, the unlocked position being a position in which the lock mechanism is disengaged from the threaded stud to permit rotation of the threaded stud relative to said one of the rotor assembly connection and the rotor blade connection.

18. A method comprising:
providing a helicopter having a fuselage including a forward section and a tail section rearward of the forward section, a main rotor assembly extending out from the forward section of the fuselage, and at least one main rotor blade coupled to the main rotor assembly, a first rotor blade portion of the rotor blade being attached to a first rotor assembly portion of the main rotor assembly via a first retention pin, a second rotor blade portion of the rotor blade being attached to a second rotor assembly portion of the main rotor assembly via a second retention pin;
providing a blade positioning mechanism comprising a rotor assembly connection adapted for connection to the main rotor assembly, a rotor blade connection adapted for connection to the rotor blade, and a threaded stud, the threaded stud having a longitudinal central stud axis, a threaded outer surface, and a journal portion journaled to one of the rotor assembly connection and the rotor blade connection for rotation of the threaded stud relative to said one of the rotor assembly connection and the rotor blade connection, the other of the rotor assembly connection and the rotor blade connection having a female knuckle threadably engaging the threaded outer surface of the threaded stud such that rotating the treaded stud about the stud axis causes said other of the rotor assembly connection and rotor blade connection to move axially along the stud axis;
removing the second retention pin in a manner such that the second retention pin is released from attaching the second rotor blade portion to the second rotor assembly portion;
moving the rotor blade relative to the main rotor assembly from the second portion attachment position to a blade positioning mechanism receiving position, the blade positioning mechanism receiving position being a position in which the second rotor blade portion is spaced a sufficient distance from the second rotor assembly portion to enable connection of the blade positioning mechanism to the second rotor blade portion and the second rotor assembly portion;
pinning the rotor assembly connection of the blade positioning mechanism to the second rotor assembly portion of the main rotor assembly at a first mechanism pin axis and pinning the rotor blade connection of the blade positioning mechanism to the second rotor blade portion of the rotor blade at a second mechanism pin axis, the pinning of the blade positioning mechanism to the second rotor assembly portion and the second rotor blade portion occurring when the rotor blade and the main rotor assembly are in the blade positioning mechanism receiving position;
moving the rotor blade relative to the main rotor assembly from the blade positioning mechanism receiving position to a stowed position, the stowed position being a position in which the second rotor blade portion is spaced a distance $D_S$ from the second rotor assembly portion, the step of moving the rotor blade from the blade positioning mechanism receiving position to the stowed position comprising rotating the threaded stud about the stud axis in a manner to cause said other of the rotor assembly connection and rotor blade connection to move axially along the stud axis until the rotor blade and the main rotor assembly are in the stowed position.

19. A method as set forth in claim 18 wherein the assembly connection of the blade positioning mechanism pivots relative to the second rotor assembly portion of the main rotor assembly about the first mechanism pin axis when the rotor blade is moved relative to the main rotor assembly from the blade positioning mechanism receiving position to the stowed position, and wherein the rotor blade connection of the blade positioning mechanism pivots relative to the second rotor blade portion of the rotor blade about the second mechanism pin axis when the rotor blade is moved relative to the main rotor assembly from the blade positioning mechanism receiving position to the stowed position.

20. A method as set forth in claim 18 wherein the blade positioning mechanism further comprises a lock mechanism connected to said one of the rotor assembly connection and the rotor blade connection, the lock mechanism being moveable relative to said one of the rotor assembly connection and the rotor blade connection between a locked position and an unlocked position, the locked position being a position in which the lock mechanism engages the threaded stud in a manner to prevent rotation of the threaded stud relative to said one of the rotor assembly connection and the rotor blade connection, the unlocked position being a position in which the lock mechanism is disengaged from the threaded stud to permit rotation of the threaded stud relative to said one of the rotor assembly connection and the rotor blade connection, the method further comprising:

maintaining the lock mechanism in the unlocked position during the step of moving the rotor blade relative to the main rotor assembly from the blade positioning mechanism receiving position to a stowed position;

moving the lock mechanism to the locked position when the rotor blade is in the stowed position to lock the rotor blade in the stowed position.

21. A blade positioning mechanism for folding a helicopter main rotor blade attached to a main rotor assembly, the main rotor blade including first and second pin-receiving openings adapted to align with first and second pin-receiving openings of the main rotor assembly, the pin-receiving openings of the main rotor blade and the main rotor assembly being sized and adapted for receiving retention pins when the first and second pin-receiving openings of the main rotor blade are aligned with the first and second pin-receiving openings of the main rotor assembly, the blade positioning mechanism comprising:

a rotor assembly connection having a pin-receiving opening, the pin-receiving opening being sized and adapted for receiving a retention pin to enable the rotor assembly connection to be pinned to the main rotor assembly when the pin-receiving opening of the rotor assembly connection is aligned with the first pin-receiving opening of the main rotor assembly;

a rotor blade connection having a pin-receiving opening, the pin-receiving opening being sized and adapted for receiving a retention pin to enable the rotor blade connection to be pinned to the main rotor blade when the pin-receiving opening of the rotor blade connection is aligned with the first pin-receiving opening of the main rotor blade, one of the rotor assembly connection and the rotor blade connection constituting a first connection, the other of the rotor assembly connection and the rotor blade connection constituting a second connection;

a threaded stud, the threaded stud having a longitudinal central stud axis, a threaded outer surface, and a journal portion journaled to the first connection for rotation of the threaded stud relative to the first connection, the second connection having a female knuckle threadably engaging the threaded outer surface of the threaded stud such that rotating the treaded stud about the stud axis causes the second connection to move axially along the stud axis; and a lock mechanism connected to the first connection, the lock mechanism being moveable relative to the first connection between a locked position and an unlocked position, the locked position being a position in which the lock mechanism engages the threaded stud in a manner to prevent rotation of the threaded stud relative to the first connection, the unlocked position being a position in which the lock mechanism is disengaged from the threaded stud to permit rotation of the threaded stud relative to the first connection.

22. A blade positioning mechanism as set forth in claim 21 wherein the lock mechanism is pivotally connected to the first connection.

23. A blade positioning mechanism as set forth in claim 21 wherein the threaded stud includes a hex-head, the lock mechanism being adapted to engage the hex-head when the lock mechanism is in the locked position, the lock mechanism being disengaged from the hex-head when the lock mechanism is in the unlocked position.

24. A method comprising:

providing a helicopter having a fuselage including a forward section and a tail section rearward of the forward section, a main rotor assembly extending out from the forward section of the fuselage, at least one main rotor blade coupled to the main rotor assembly, and a removable link, the rotor blade having first and second rotor blade portions, the rotor assembly having first and second rotor assembly portions, the first rotor blade portion being adapted for attachment to the first rotor assembly portion via a pin, the second rotor blade portion being adapted for attachment to the second rotor assembly portion via another pin, the removable link comprising a blade connection portion and a rotor assembly connection portion, the rotor assembly connection portion being spaced from the blade connection portion, the first rotor assembly portion being pinned to the rotor assembly connection portion via a first retention pin at a first pin axis, the first rotor blade portion being pinned to the blade connection portion via a second retention pin at a second pin axis, the rotor blade being moveable relative to the main rotor assembly between a second portion attachment position and a spaced position, the second portion attachment position being a position in which the second rotor blade portion is adjacent the second rotor assembly portion, the spaced position being a position in which the second rotor blade portion is spaced a distance from the second rotor assembly portion, the rotor blade pivoting about at least one of the first and second pin axes when the rotor blade is moved relative to the main rotor assembly between the second portion attachment position and the spaced position;

providing a blade attachment mechanism, the blade attachment mechanism having a pin-engaging portion and a handle portion extending from the pin-engaging portion, the pin-engaging portion being sized and adapted to simultaneously engage the first and second retention pins when the first and second retention pins are located relative to the rotor blade and the rotor assembly at the first and second pin axes;

engaging the first and second retention pins with the pin-engaging portion in a manner such that the handle extends generally laterally away from the first and second pin axes when the rotor blade is in the spaced position;

applying a force to the handle to exert forces on the retention pins in a manner to at least assist in moving the rotor blade from the spaced position to the second portion attachment position.

25. A method as set forth in claim 24 wherein:

the second rotor blade portion includes a pin-receiving aperture, the second rotor assembly portion includes a pin-receiving aperture, and the pin-receiving aperture of the second rotor blade portion is aligned with the pin-receiving aperture of the second rotor assembly portion when the rotor blade is in the second portion attachment position; and the step of applying a force to the handle to exert forces on the retention pins comprises applying forces on the handle to at least assist in moving the rotor blade relative to the main rotor assembly in a manner to align the pin-receiving aperture of the second rotor blade portion with the pin-receiving aperture of the second rotor assembly portion.

* * * * *